United States Patent [19]
Asahara et al.

[11] Patent Number: 5,486,146
[45] Date of Patent: Jan. 23, 1996

[54] HYDRAULIC CONTROL CIRCUIT FOR AUTOMATIC TRANSMISSION

[75] Inventors: Norimi Asahara, Aichi; Kagenori Fukumura, Toyota; Yasuo Hojo, Nagoya; Kazuhisa Ozaki, Aichi, all of Japan

[73] Assignee: Aisin AW Co., Ltd., Japan

[21] Appl. No.: 301,896

[22] Filed: Sep. 7, 1994

[30] Foreign Application Priority Data

Sep. 7, 1993 [JP] Japan .................................. 5-221889

[51] Int. Cl.$^6$ .................................................. F16H 61/14
[52] U.S. Cl. .................................................. 477/65; 477/62
[58] Field of Search ........................................ 477/62, 65

[56] References Cited

U.S. PATENT DOCUMENTS

| | | | |
|---|---|---|---|
| 4,428,259 | 1/1984 | Kubo et al. ................................ | 477/65 |
| 4,428,467 | 1/1984 | Hiramatsu ................................. | 477/65 |
| 4,468,988 | 9/1984 | Hiramatsu ................................. | 477/65 |
| 4,570,770 | 2/1986 | Nishikawa et al. ....................... | 477/65 |
| 4,998,604 | 3/1991 | Vukovich et al. ........................ | 477/65 |
| 5,010,991 | 4/1991 | Tsukamoto et al. ...................... | 192/3.3 |
| 5,152,386 | 10/1992 | Imamura ................................. | 477/62 |

FOREIGN PATENT DOCUMENTS

| | | |
|---|---|---|
| 280857 | 3/1990 | Japan . |
| 2253409 | 10/1990 | Japan . |

Primary Examiner—Dirk Wright
Attorney, Agent, or Firm—Lorusso & Loud

[57] ABSTRACT

A hydraulic control circuit for an automatic transmission which has a plurality of hydraulic type frictional engagement elements for switching gear stages and a lockup clutch juxtaposed to a hydraulic power transmission device for transmitting engine power to the gearing. The hydraulic control circuit includes a lockup relay valve for switching oil pressure between an application side oil chamber and a release side oil chamber of the lockup clutch to apply and release the lockup clutch and a lockup switching valve for switching the lockup relay valve. A lockup control valve functions to increase the pressure difference between the application side oil chamber and the release side oil chamber at the time of application of the lockup clutch, as a signal pressure rises. A transient pressure control valve controls the transient pressure of a hydraulic frictional engagement element in accordance with the signal pressure. A single linear solenoid valve regulates the signal pressure fed both to the lockup control valve and to the transient pressure control valve. A signal pressure relay valve has a first output port connected to the lockup control valve and a second output port connected to the transient pressure control valve. The signal pressure relay valve is switched by first and second relay pressures to selectively switch the destination of the signal pressure which is regulated by the linear solenoid valve. When the signal pressure is fed to the accumulator control valve, a modulator oil pressure is fed to the lockup control valve.

4 Claims, 12 Drawing Sheets

Fig. 2

| Shift Position | | Solenoid | | | | Clutch | | | Brake | | | |
|---|---|---|---|---|---|---|---|---|---|---|---|---|
| | | S1 | S2 | S3 | SL | C0 | C1 | C2 | B0 | B1 | B2 | B3 |
| P | | × | × | × | × | ○ | × | × | × | × | × | × |
| R | $V<\alpha$ | × | × | × | × | ○ | × | ○ | × | × | × | ○ |
| | $V\geq\alpha$ | × | ○ | × | × | ○ | × | × | × | × | × | × |
| N | | × | × | × | × | ○ | × | × | × | × | × | × |
| D | 1st | ○ | × | × | × | ○ | ○ | × | × | × | × | × |
| | 2nd | ○ | ○ | × | × | ○ | ○ | × | × | × | ○ | × |
| | 3rd | × | ○ | ◎ | ◎ | ○ | ○ | ○ | × | × | ○ | × |
| | O/D | × | × | ◎ | ◎ | × | ○ | ○ | ○ | × | ○ | × |
| 2 | 1st | ○ | × | × | × | ○ | ○ | × | × | × | × | × |
| | 2nd | ○ | ○ | × | × | ○ | ○ | × | × | ○ | ○ | × |
| | 3rd | × | ○ | ◎ | ◎ | ○ | ○ | ○ | × | × | ○ | ○ |
| L | 1st | ○ | × | × | × | ○ | ○ | × | × | × | × | × |
| | 2nd | ○ | ○ | × | × | ○ | ○ | × | × | ○ | ○ | × |

HYDRAULIC CONTROL CIRCUIT FOR AUTOMATIC TRANSMISSION

BACKGROUND OF THE INVENTION

1. Field of the Invention

The present invention relates to a hydraulic control circuit for an automatic transmission and, more particularly, to a hydraulic control circuit for effecting both the transient pressure control of frictional engagement means and the slip control of a lockup clutch during shifting by a single pressure regulator valve.

2. Description of the Related Art

In a vehicle having an automatic transmission, the engine power is transmitted to the automatic transmission through a fluid coupling such as a torque converter. In order to improve the mileage and absorb any fluctuation in torque, a lockup clutch is interposed in the fluid coupling such that it may either be fully engaged or applied with slipping, as disclosed in Japanese Patent Laid-Open No. 80857/1990. In the case of a lockup clutch applied with slippage, the hydraulic control circuit is usually constructed to include: a lockup relay valve for applying or releasing the lockup clutch by switching the oil pressure between the application side oil chamber and the release side oil chamber of the lockup clutch; lockup switching means for switching the lockup relay valve; a lockup control valve for increasing the difference between the pressure in the application side oil chamber and the oil pressure in the release side oil chamber at the time of application of the lockup clutch, as a signal pressure rises; and a lockup controlling pressure regulator valve for regulating the signal pressure so that the lockup clutch may come into a predetermined state of slippage.

The automatic transmission is equipped with a plurality of gear stages to be selected by applying and releasing hydraulic type frictional engagement means such as clutches and brakes, and with a hydraulic control circuit including a transient pressure control valve for controlling the transient pressure at the time of application and release of the hydraulic type frictional engagement means so that the shock at the time of shifting may be reduced. The transient pressure is controlled according to the signal pressure which is regulated by a transient pressure controlling pressure regulator valve. When the state of the hydraulic type frictional engagement means is switched by operating the shift lever, as in the case of moving the shift ever from a P (parking) range to an R (reverse) range or from an N (neutral) range to a D (drive) range, the shifting shock is also reduced as at the time of shifting by controlling the transient pressure with the transient pressure control valve. The pressure regulator valve for controlling the transient pressure and the pressure regulator valve for the lockup control are each described in the prior art, as in the aforementioned hydraulic control circuit of Japanese Patent Laid-Open No. 80857/1990. The provision of separate pressure regulator valves makes the hydraulic control circuit complex and large-sized and raises the production cost. The pressure regulator valve is either a linear solenoid valve or a duty solenoid valve. Where a linear solenoid valve is used, a more accurate pressure regulation can be achieved, but the above-specified problem becomes more serious because the valve per se is large-sized and expensive.

In view of the foregoing it has been proposed that both the transient pressure control and the slip control of the lockup clutch be provided by a single pressure regulator valve, as disclosed in Japanese Patent Laid-Open No. 253049/1990. Since, in this case, the transient pressure control and the lockup clutch application control have to be temporarily overlapped to prevent racing of the engine at the time of an upshift, the slip control of the lockup clutch is effected exclusively at the highest gear stage where no transient pressure control is required. Specifically, a signal pressure output from the single pressure regulator valve is continuously supplied to both the transient pressure control valve and the lockup control valve, but the lockup control valve is connected to the lockup clutch only at the highest gear stage to control the pressure in the release side oil chamber. At the remaining gear stages, the oil passage to the lockup clutch is blocked to disable the regulating action of the lockup control valve but enable the regulating action of the transient pressure control valve.

However, if the slip control cannot be achieved at the gear stages other than the highest one, a sufficient mileage improving effect cannot be achieved by the slip control. Since, moreover, the lockup clutch is directly switched between the released state and the fully applied state at the gear stages other than the lighest one, the engine R.P.M. and the transmission torque may abruptly change to cause a shock.

SUMMARY OF THE INVENTION

The present invention has been conceived in view of the background thus far described and has as an object provision of a hydraulic control circuit which, by operation of a single pressure regulator valve, effects the slip control of the lockup clutch at a plurality of gear stages and controls the transient pressure of the frictional engagement means at the time of shifting and at the time of movement of the shift lever and which can start the transient pressure control while the lockup clutch is applied, at the time of an upshift.

In order to achieve the above-specified object, according to a first aspect of the present invention, there is provided a hydraulic control circuit for an automatic transmission, including: (a) a plurality of hydraulic type frictional engagement elements for switching between the gear stages of the automatic transmission; (b) a lockup clutch in conjunction with a hydraulic power transmission device, e.g. fluid coupling, for transmitting engine power to the automatic transmission; (c) a lockup relay valve for switching the oil pressure between the application side oil chamber and the release side oil chamber of the lockup clutch to apply and release the lockup clutch; (d) lockup switching means for switching the lockup relay valve; (e) a lockup control valve for increasing the pressure differential between the pressure in the application side oil chamber and the pressure in the release side oil chamber at the time of application of the lockup clutch, as a signal pressure rises; (f) a transient pressure control valve for controlling the transient pressure of the hydraulic frictional engagement elements in accordance with the signal pressure; (g) a single pressure regulator valve for regulating a single signal pressure fed to both the lockup control valve and the transient pressure control valve: (h) a signal pressure relay valve; and (i) signal pressure switching means for moving the switch valve member of the signal pressure relay valve selectively to the first position or the second position. The signal pressure relay valve has a first input port adapted to receive the signal pressure; a second input port adapted to receive a substitution pressure which, in place of the signal pressure, is output to the lockup control valve to apply lockup clutch; a first output port connected to the lockup control valve; a second output port connected to the transient pressure control valve;

and a switch valve member providing, in a first position, communication between the first input port and the second output port and the communication between the second input port and the first output port, and, in a second position, communication between the first input port and the first output port.

In this hydraulic control circuit, when the valve member of the signal pressure relay valve is held in the second position by the signal pressure switching means, the signal pressure regulated by the pressure regulator valve is output to the lockup control valve. In this state, therefore, the lockup clutch can be applied with slipping, in accordance with the signal pressure. In both the case of full engagement and in the case of application with slipping of the lockup clutch, the lockup relay valve is switched to the clutch application side by the lockup switching means.

At the time of shifting the gear stages of the automatic transmission, on the other hand, the signal pressure regulated by the pressure regulator valve can be fed to the transient pressure control valve by moving the valve member of the signal pressure relay valve to the first position by the signal pressure switching means. As a result, the transient pressure when the hydraulic type frictional engagement element is applied or released can be gradually changed to prevent shock at the time of shifting. If, in this case, the valve member of the signal pressure relay valve is moved to the first position, the lockup control valve is fed with a substitution pressure capable of applying the lockup clutch. Thus, so long as the lockup relay valve is held at the clutch application side, the lockup clutch is held in the applied state even if the valve member of the signal pressure relay valve is moved to the first position. As a result, when an upshift is effected with the lockup clutch being applied, the transient pressure control can be started with the lockup clutch being applied, by moving the valve member of the signal pressure relay valve to the first position while holding the lockup relay valve at the clutch application side, so that excessive racing of the engine, which might otherwise be caused by releasing the lockup clutch, can be avoided. If the lockup relay valve is switched to the clutch release side by the lockup switching means when the transient pressure changes to bring the frictional engagement means into a predetermined state of slippage, then the lockup clutch is released so that the abrupt change in the engine R.P.M. caused by the shift can be reduced by the fluid coupling.

Even when the hydraulic type frictional engagement elements are switched by moving the shift lever, e.g. from the P-range to the R-range, it is unnecessary to apply the lockup clutch with slippage because the shifting shock can be reduced by controlling the transient pressure by the transient pressure control valve as at the time of shifting.

Thus, in a first aspect, the present invention provides a hydraulic control circuit which uses a single pressure regulator valve to effect slip control of the lockup clutch at the plurality of gear stages and to control the transient pressure of the frictional engagement means at the time of a shift and at the time of operation of the shift lever and which can start the transient pressure control while the lockup clutch is applied, e.g. during an upshift with the lockup clutch applied.

In order to achieve the aforementioned object, according to a second aspect of the present invention, there is provided a hydraulic control circuit for an automatic transmission, including: (a) a plurality of hydraulic type frictional engagement elements for switching between the gear stages of the automatic transmission; (b) a lockup clutch in a hydraulic power transmission device for transmitting engine power to the automatic transmission; (c) a lockup relay valve for switching the oil pressure between the application side oil chamber and the release side oil chamber of the lockup clutch to apply and release the lockup clutch; (d) first relay pressure changing means for turning ON/OFF a first relay pressure to switch the lockup relay valve; (e) a lockup control valve for increasing the difference between the pressure in the application side oil chamber and the pressure in the release side oil chamber at the time of engagement of the lockup clutch, responsive to a rise in signal pressure; and (f) a transient pressure control valve for controlling the transient pressure of the hydraulic frictional engagement elements in accordance with the signal pressure. The hydraulic control circuit of the present invention further includes: (g) a single pressure regulator valve for regulating a single signal pressure fed to both the lockup control valve and the transient pressure control valve; (h) a signal pressure relay valve and (i) a sequence/reverse control valve. The signal pressure relay valve (h) has a first input port adapted to receive the signal pressure; a second input port adapted to receive a substitution pressure, in place of the signal pressure, output to the lockup control valve to apply the lockup clutch; a first output port connected to the lockup control valve; a second output port connected to the transient pressure control valve; a valve member which, in a first position, provides communication between the first input port and the second output port and communication between the second input port and the first output port, and, in a second position, provides communication between the first input port and the first output port; bias means for urging the valve member to the first position; a first relay oil chamber adapted to receive the first relay pressure for moving the valve member to the second position against the biasing force of the bias means; and a second relay oil chamber adapted to receive a second relay pressure for moving the switch valve member to the first position independently of the first relay pressure.

The sequence/reverse control valve has a first input port adapted to receive a higher stage pressure output when a higher one of a plurality of consecutive forward gear stages for applying said lockup clutch is to be established; a second input port adapted to receive a reverse stage pressure output when a reverse gear stage is to be established; a first output port connected to the second relay oil chamber of the signal pressure relay valve; and a second output port for outputting the reverse stage pressure to apply that one of the plurality of hydraulic type frictional engagement elements which establishes the reverse gear stage. The sequence/reverse control valve has a central bore which contains a valve member which, in turn, is movable between a first position, in which it establishes communication between the first input port and the first output port and blocks communication between the second input port and the second output port, and a second position, in which it provides communication between the second input port and the second output port and blocks communication between the first input port and the first output port. The sequence/reverse control valve also includes bias means for urging the valve member toward the first position; a first relay oil chamber adapted to receive the first relay pressure to urge the valve member to the first position; a second relay oil chamber adapted to receive a third relay pressure, which is output when the higher gear stage and the reverse gear stage are to be established but not when the establishment of the reverse gear stage is blocked under a predetermined condition, to urge the valve member to the second position; and a third relay oil chamber adapted to receive the third relay pressure when the valve member is held in said first position, to urge the valve member to the first position. When the first relay pressure is fed to the first relay oil chamber so that the valve member is held in the first position, the valve member is still held in the first position, even if the third relay pressure is fed to the second relay oil chamber and the third relay oil chamber in accordance with the shift to the higher gear stage, so that the higher stage pressure is output as the second relay pressure to the second relay oil chamber of the signal pressure relay valve. When the feed of the first relay pressure is interrupted at the higher gear stage, the valve member is moved to the second position against the biasing force of the bias means due to the difference between the pressure receiving areas of the valve member in the second relay oil chamber and the pressure receiving areas in the third relay oil chamber. The valve member is held in the second position on the basis of the third relay pressure fed to the second relay oil chamber, even if the first relay pressure is fed to the first relay oil chamber. At the time of a shift to the reverse gear stage, the valve member is positioned by the third relay pressure and the biasing force of the bias means.

In this hydraulic control circuit, when the first relay pressure is turned OFF by the first relay pressure switching means, the lockup relay valve is held at the clutch release side to release the lockup clutch, and the valve member of the signal pressure relay valve is held in the first position by the biasing force of the bias means, so that the signal pressure regulated by the pressure regulator valve is output to the transient pressure control valve. In this state, therefore, the transient pressure when the hydraulic type frictional engagement means is applied or released can be controlled to reduce the shock at the time of a shift and at the time of operation of the shift lever. When full engagement or application with slipping of the lockup clutch is established at a given gear stage, the lockup relay valve is switched to the clutch application side by turning ON the first relay pressure by the first relay pressure switching means, and the valve member of the signal pressure relay valve is moved to the second position against the biasing force of the bias means so that the signal pressure regulated by the pressure regulating valve is introduced into the lockup control valve. On the basis of the signal pressure, the lockup clutch is either fully engaged or applied with slippage.

In the case of an upshift to a higher gear stage when the lockup clutch is either fully engaged or applied with slipping, at a lower one of the plurality of consecutive gear stages for applying the lockup clutch, the valve member of the sequence/reverse control valve is held in the first position, even if fed with the third relay pressure, by the first relay pressure and the biasing force of the bias means, so that the higher stage pressure is introduced as the second relay pressure through the sequence/reverse control valve into the second relay chamber of the signal pressure relay valve. As a result, the valve member of the signal pressure relay valve is moved to the first position, and the signal pressure regulated by the pressure regulator valve is fed to the transient pressure control valve so that the transient pressure of the hydraulic frictional engagement elements can be controlled to reduce the shift shock. Since, at this time, the lockup control valve is fed the substitution pressure capable of engaging the lockup clutch, the lockup clutch can be held in the engaged state so long as the lockup relay valve is held in the clutch application position. In short, the transient pressure control can be started while leaving the lockup clutch engaged, to avoid excessive racing of the engine, which might otherwise be caused by releasing the lockup clutch. If the first relay pressure is turned OFF when the transient pressure changes so that the frictional engagement means comes into a predetermined state of slippage, the lockup relay valve is switched to the clutch release position to release the lockup clutch so that the abrupt change in the engine R.P.M. accompanying the shift can be reduced by the fluid coupling.

When the first relay pressure is turned OFF, as described above, the valve member of the sequence/reverse control valve is moved to the second position responsive to the third relay pressure, to interrupt the feed of the aforementioned higher stage pressure to the signal pressure relay valve. In this state, moreover, the valve member is held in the second position even if it again receives the first relay pressure. Thus, so long as the gear stage is held at the higher one in which the third relay valve receives oil pressure, the valve member of the sequence/reverse control valve is held in the second position no matter whether the first relay pressure might be ON or OFF, the higher stage pressure is not fed as the second relay pressure to the signal pressure relay valve, and the valve member of the signal pressure relay valve is held in the first position by the bias means, so that the valve member of the signal pressure relay valve is moved to the second position or the first position exclusively in response to the ON and OFF of the first relay pressure. As a result, at this higher gear stage, as in other gear stages, the lockup clutch can be applied or released by turning ON and OFF the first relay pressure by the first relay pressure switching means, and the application with slip can be effected by the pressure regulator valve at the time of applying the clutch.

The sequence/reverse control valve has its valve member moved, when the shift lever is moved to the R (reverse) range, by the third relay pressure, to the second position so that it outputs the reverse stage pressure to establish the reverse gear stage. Unless the third relay pressure is received, the sequence/reverse control valve has its valve member held in the first position by the biasing force of the bias means so that it inhibits the output of the reverse stage pressure to block the establishment of the reverse gear stage. The third relay pressure is not output when the forward vehicle speed exceeds a predetermined value, even if the shift lever is moved to the R-range, so that establishment of the reverse gear stage by a mistake in operation of the shift lever is prevented.

Thus, according to the second aspect of the present invention, it is possible to provide a hydraulic control circuit which uses a single pressure regulator valve to effect the slip control of the lockup clutch at the plurality of gear stages and to control the transient pressure of the frictional engagement elements at the time of a shift and at the time of operation of the shift lever and which can start the transient pressure control while the lockup clutch is applied, at the time of an upshift. Especially at the time of an upshift to a higher gear stage with the lockup clutch applied, the higher stage pressure for establishing that higher gear stage is fed as the second relay pressure to the signal pressure relay valve so that the valve member of the signal pressure relay valve is forcibly moved to the first position, irrespective of the presence of the first relay pressure. As a result, no special control for switching the signal pressure relay valve is required. At the same time, the sequence/reverse control valve for outputting the second relay pressure also functions to block the establishment of the reverse gear stage at a predetermined condition. As a result, the number of valves can be reduced to make the hydraulic control circuit advantageously compact.

According to a third aspect of the present invention, a hydraulic control circuit according to the first or second aspect, further includes: (a) a fuel relay valve arranged between the signal pressure relay valve and the transient pressure control valve and having: a first input port connected to the second output port of the signal pressure relay valve; a second input port adapted to receive a predetermined fuel substitution pressure; an output port connected to the transient pressure control valve; and a valve member slidable between a first position, in which it provides the communication between the first input port and the output port, and a second position in which it provides the communication between the second input port and the output port; and (b) fuel switching means for moving the valve member of the fuel relay valve selectively to either the first position or the second position.

In this hydraulic control circuit, the valve member of the fuel relay valve is ordinarily held in the first position by the fuel switching means, and the signal pressure output from the second output port of the signal pressure relay valve is fed to the transient pressure control valve through the fuel relay valve so that the transient pressure of the hydraulic type frictional engagement elements regulated by the signal pressure which, in turn, is regulated by the pressure regulator valve. In the case of a malfunction, such as a failure to regulate the signal pressure or the interruption of feed of the signal pressure occurs in the pressure regulator valve, the signal pressure relay valve or their drive control circuits, a predetermined fuel substitution pressure is fed in place of the signal pressure to the transient pressure control valve by moving the valve member of the fuel relay valve to the second position by the fuel switching means, so that the transient pressure is regulated on the basis of the fuel substitution pressure. As a result, even if a malfunction occurs, the transient pressure is regulated to a predetermined level to minimize the shock resulting from the abrupt application of a frictional engagement element and to minimize wear of the frictional engagement elements due to a delay in application. Whether or not a malfunction has occurred can be detected in terms of the rotational speeds of the individual components of the automatic transmission, the R.P.M. of the engine and the oil pressures in the individual components of the hydraulic control circuit.

For control of the lockup clutch at the time of a malfunction, the lockup clutch can be released by switching the lockup relay valve to the release side, independently of the signal pressure, by the pressure regulation means described in connection with the first aspect of the present invention or by the first relay pressure changing means described in connection with the second aspect.

In the case of a malfunction such as a failure to regulate the signal pressure or interruption of feed of the signal pressure occurs in the pressure regulator valve, the signal pressure relay valve or one of their drive control circuits, the fuel substitution pressure is fed in place of the signal pressure to the transient pressure control valve so that the transient pressure to the frictional engagement elements can be regulated on the basis of that fuel substitution pressure. As a result, even if a malfunction occurs, it is possible to minimize the shock resulting from an abrupt application of a frictional engagement element and to minimize wear shortening of the lifetime of the frictional element due to the delay in application.

BRIEF DESCRIPTION OF THE DRAWINGS

FIG. 2 is a table showing which clutches and brakes are applied to establish the individual gear stages of the automatic transmission of FIG. 1;

DESCRIPTION OF THE PREFERRED EMBODIMENTS

Various embodiments of the present invention will be described in detail in the following with reference to the accompanying drawings.

Figure 1:
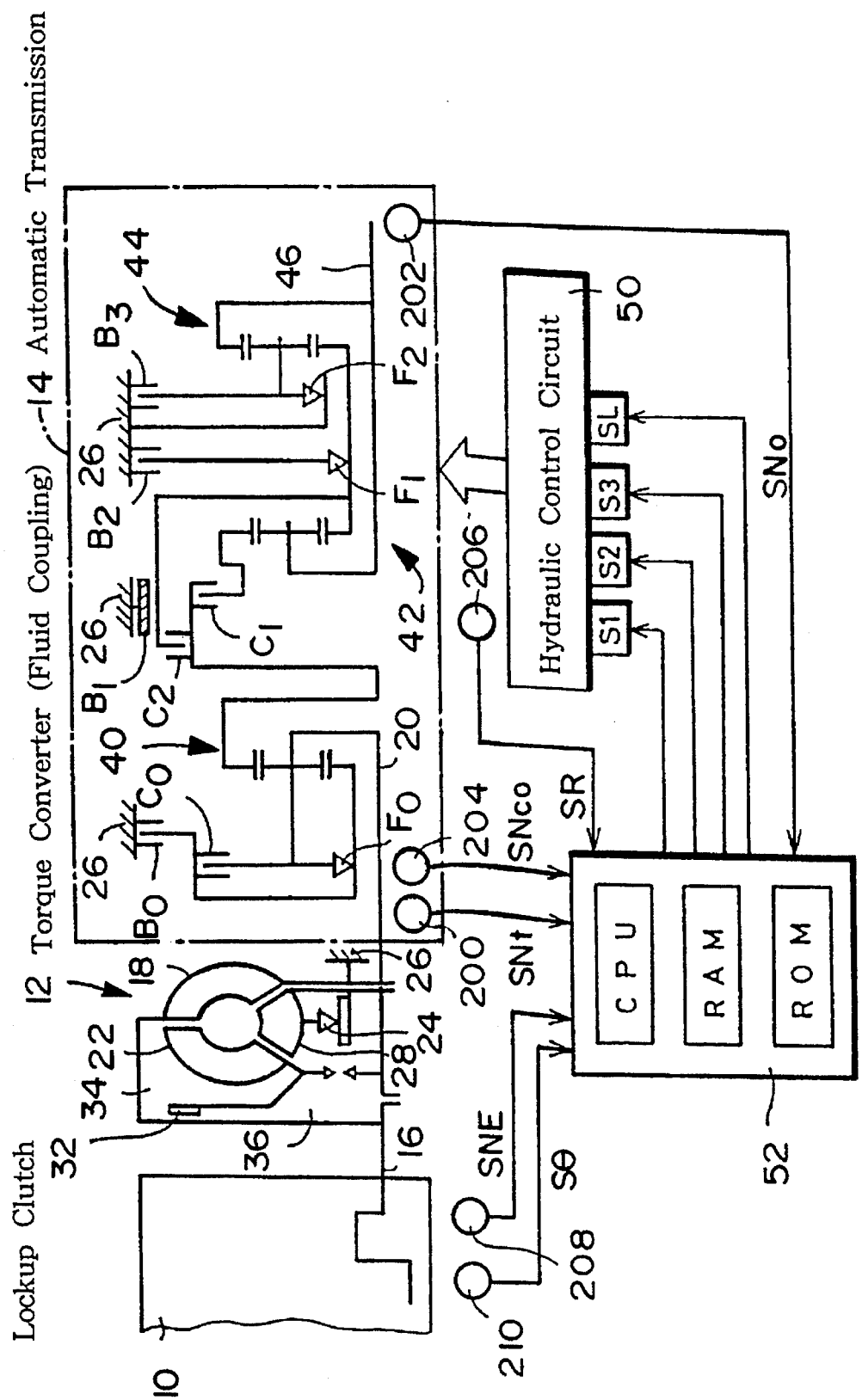
FIG. 1 is a schematic diagram showing one example of a vehicular power transmission equipped with a hydraulic control circuit according to one embodiment (first and second modes) of the present invention.

In FIG. 1, an internal combustion engine 10 has its output transmitted through a fluid coupling or torque converter 12 and an automatic transmission 14 to the drive wheels of a vehicle via a differential gear unit (not shown). The torque converter 12 includes a turbine blade 18 connected to the crankshaft 16 of the engine 10, a stator blade 28 fixed against rotation through a one-way clutch 24; and a lockup clutch 32 connected to the aforementioned input shaft 20 through a damper. The lockup clutch 32 is disengaged when the oil pressure in the release side oil chamber 36 of the torque converter 12 is raised to exceed that in application side oil chamber 34, so that the transmitted torque is amplified according to the input/output R.P.M. ratio of the torque converter 12. On the other hand, when the oil pressure in the application side oil chamber 34 exceeds that in the release side oil chamber 36, the lockup clutch 32 comes into engagement so that the engine output is transmitted as is from the crankshaft 16 to the input shaft 20 through the lockup clutch 32.

The automatic transmission 14 includes three sets of single pinion type planetary gear mechanisms arranged on a common shaft; the aforementioned input shaft 20; and an output shaft 46 connected to the carrier of the planetary gear mechanism 42 and the ring gear of the planetary gear mechanism 44. The planetary gear mechanisms 40, 42 and 44 have some of their components integrally connected to each other and other components connected selectively either to each other through three clutches $C_0$, $C_1$ and $C_2$ or to the housing 26 through four brakes $B_0$, $B_1$, $B_2$ and $B_3$. These components are further made to engage with each other or the housing 26 by three one-way clutches $F_0$, $F_1$ and $F_2$ depending upon their directions of rotation. Because the torque converter 12 and the automatic transmission 14 are constructed symmetrically with respect to their longitudinal axes, their lower halves are omitted from FIG. 1.

The aforementioned clutches $C_0$ to $C_2$ and brakes $B_0$ to $B_3$ thereinafter referred to collectively as the "clutch C" or the "brake B" are the hydraulic type frictional engagement devices, the engagement of which is controlled by an hydraulic actuator fed with the working oil from a hydraulic control circuit 50. These devices include multi-disc clutches and band brakes. This hydraulic control circuit 50 is equipped with a number of switch valves for establishing one of four forward gear stages, from 1st to O/D stages, when solenoids S1 and S2 are individually energized or deenergized in the "D" range, as shown in FIG. 2. The gear ratios (=the R.P.M. Nt of the input shaft 20/the R.P.M. No of the output shaft 46) of those gear stages become smaller from the 1st to O/D gear stages and become 1 at the 3rd gear stage The shift positions "P", "R", "D", "2" and "L" designate the shift ranges which may be selected by operation of the shift lever near the driver's seat. In the "2" range, the shift is controlled at the three stages of 1st to 3rd speeds. In the "L" range, the shift is controlled at the two stages of 1st to 2nd speeds. When the manual shift valve is switched as the shift lever is operated, the brakes $B_1$ and $B_3$ are applied to effect engine braking at the 2nd speed of the "2" and "L" ranges and at the 1st speed of the "L" range, and the reverse gear stage is established in the "R" range. Even in the "R" range, if a forward vehicle speed V exceeds a predetermined constant value α, the solenoid S2 is energized to block the reverse gear stage. In the Solenoid columns: symbol "○" indicates "ON" (energized); symbol "X" indicates "OFF" (deenergized); and symbol "⊙" indicates "ON" (energized) at the time of the lockup control. These states are individually controlled by a control unit 52. In the clutch and brake columns, on the other hand, the symbol "○" indicates the applied state, and the symbol "X" indicates the released state. In the present embodiment, the application of the lockup clutch 32 is controlled at the successive 3rd and O/D gear stages. A solenoid SL, which controls the back pressures of the accumulators of the aforementioned clutch C and brake B, is energized at the time of a shift and when the shift lever is operated although not shown in FIG. 2.

Figure 3:
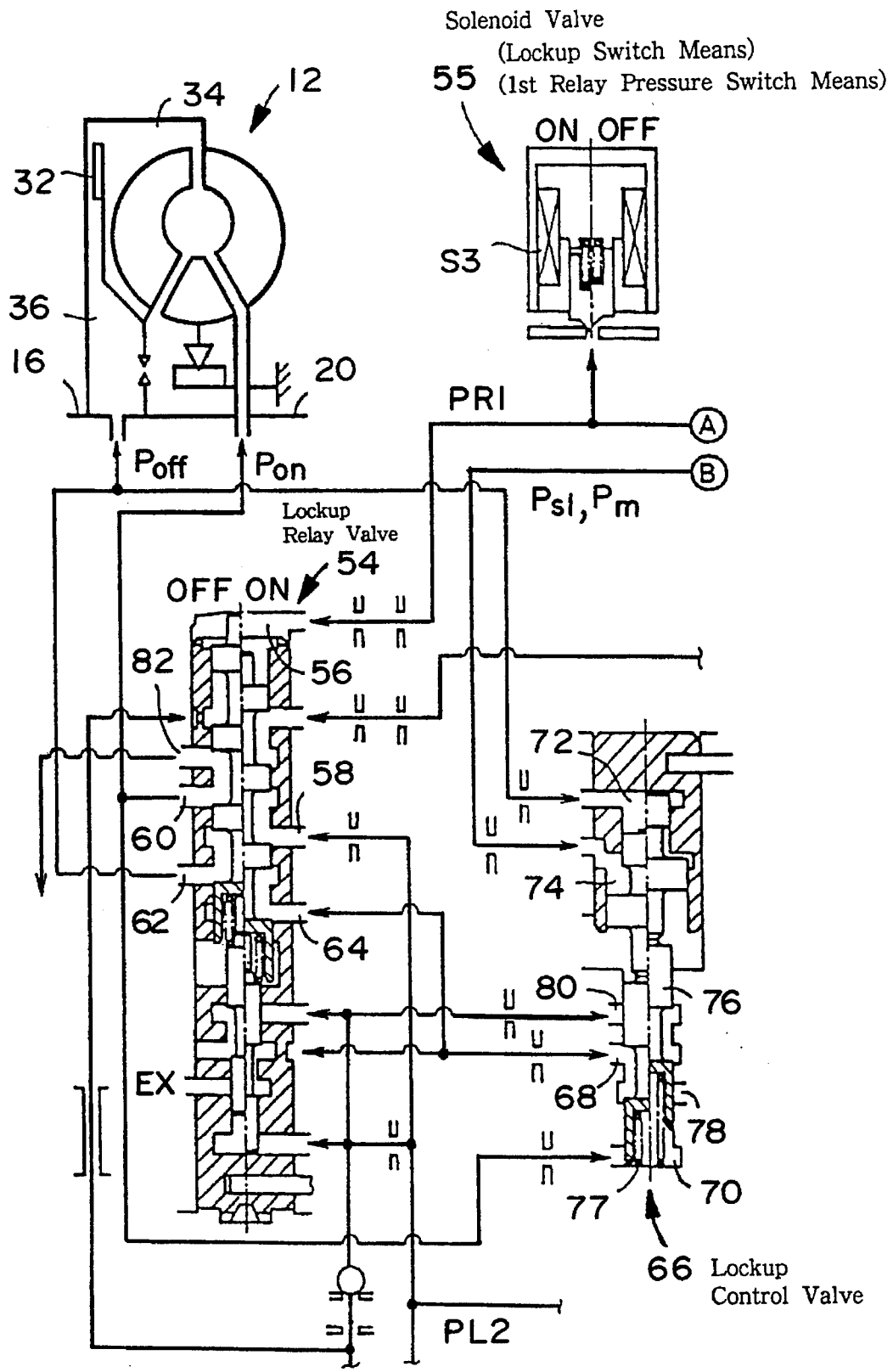
FIG. 3 is a circuit diagram schematically showing an essential portion of the hydraulic control circuit of FIG. 1.
Figure 4:
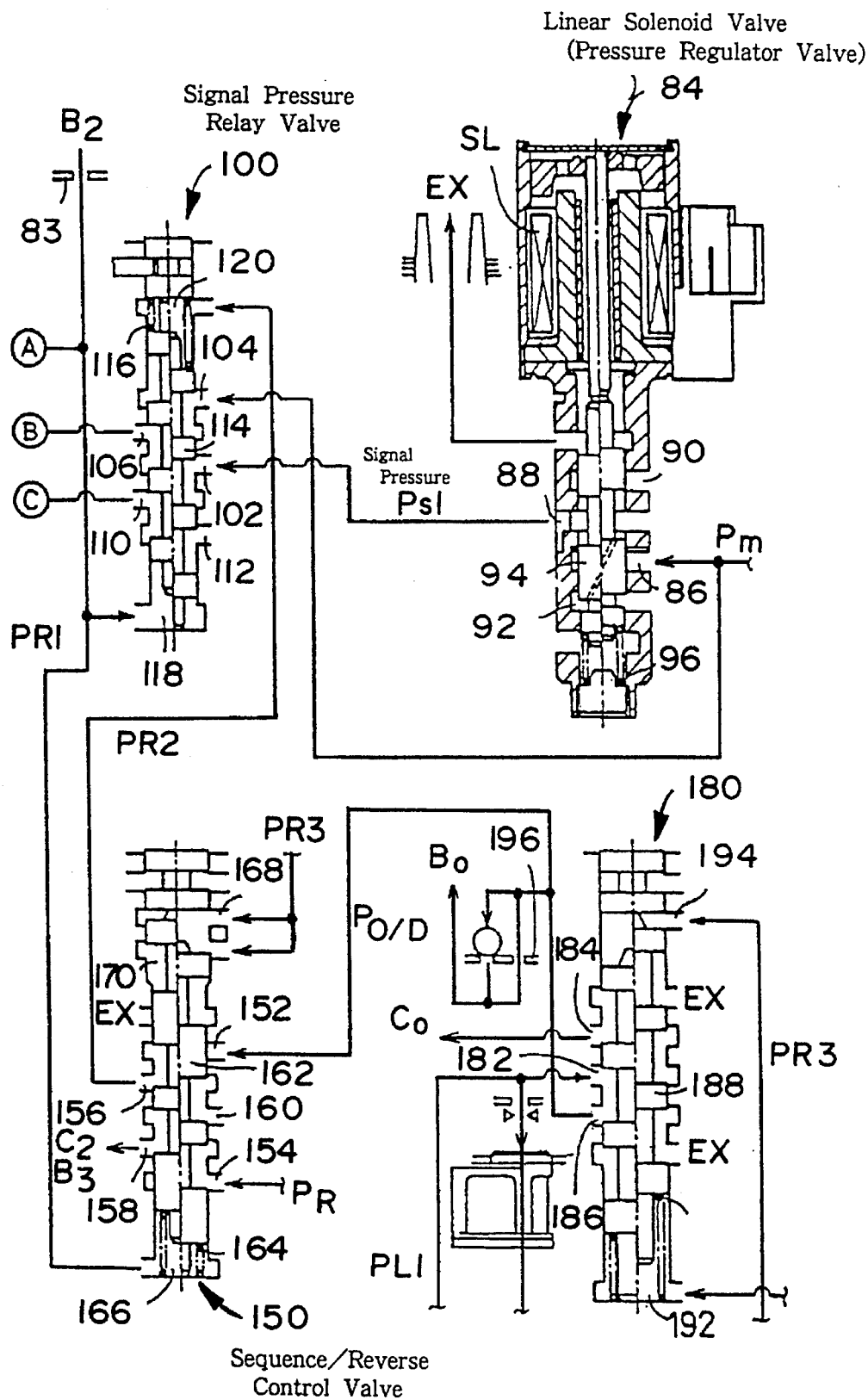
FIG. 4 is a circuit diagram schematically showing another essential portion of the hydraulic control circuit of FIG. 1.
Figure 5:
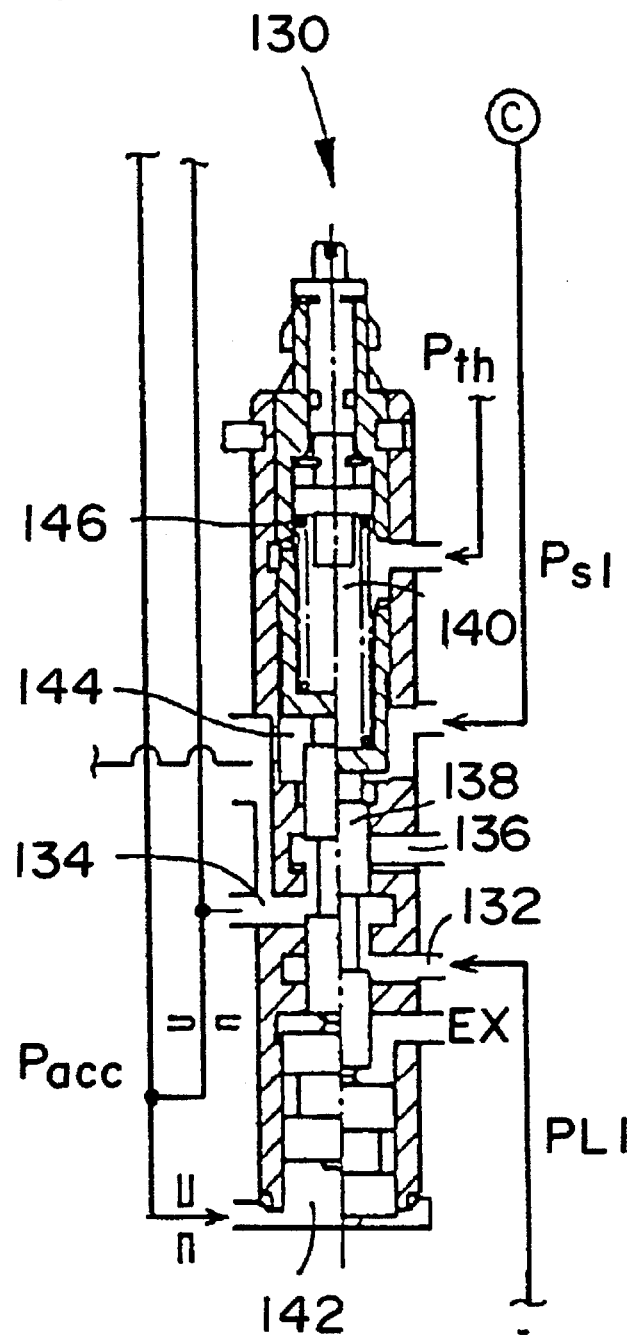
FIG. 5 is a circuit diagram schematically showing yet another essential portion of the hydraulic control circuit of FIG. 1.

The aforementioned hydraulic control circuit 50 includes lockup controlling circuits and accumulator back pressure controlling circuits, as shown in FIGS. 3 to 5. A lockup relay valve 54 of FIG. 3 is brought into the ON state, as shown at the right-hand half, when a first relay pressure PR1 output by energization of the solenoid S3 of a solenoid valve 55 is received by relay oil chamber 56. Then, the lockup relay valve 54 feeds a secondary pressure PL2 from a port 60, which is regulated in accordance with the output torque of the engine 10 and connects the release side oil chamber 36 with a port 68 of a lockup control valve 66 via ports 62 and 64. The lockup control valve 66 includes a first oil chamber 70 which receives the application pressure Pon that is applied to the application side oil chamber 34; a second oil chamber 72 which receives the release pressure Poff that is applied to the release side oil chamber 36; a signal pressure port which receives a signal pressure Psl; and a spring 77 for urging a spool valve member 76 toward the oil chambers 72 and 74. The spool valve member 76 is positioned by the aforementioned pressures and spring force, to feed secondary pressure PL2 from the aforementioned port 68 to either a drain port 78 or a pressure port 80, so that the release pressure Poff is regulated to adjust the pressure-difference ΔP between the application pressure Pon and the release pressure Poff in accordance with the signal pressure Psl. Specifically, when the signal pressure Psl is sufficiently high, the release pressure Poff is lowered to increase the pressure difference ΔP so that the lockup clutch 32 becomes fully applied. As the signal pressure Psl drops, the release pressure Poff rises accordingly to decrease the pressure difference ΔP so that the lockup clutch 32 is applied with slippage by a force corresponding to the pressure difference ΔP. On the other hand, when the solenoid S3 is deenergized so that the first relay pressure PR1 is OFF, the lockup relay valve 54 comes into the OFF state, as shown at the left-hand side, so that communication between the input port 58 and the port 62 is provided to apply the secondary pressure PL2 to the release side oil chamber 36, whereas the communication between the aforementioned port 60 and a drain port 82 is provided to drain the working oil from the application side oil chamber 34 to the oil cooler or the like. As a result, the lockup clutch 32 is released. The aforementioned first relay pressure PR1 can be output only in the case of the 2nd, 3rd or O/D gear stage, as apparent from FIG. 2, because a $B_2$ pressure for applying the brake $B_2$ is introduced through an orifice 83 (as shown in FIG. 4). The $B_2$ pressure has a value equal to that of the primary pressure PL1 to be regulated according to the output torque of the engine 10. The solenoid valve 55 for turning ON and OFF the output of the first relay pressure PR1 serves as the lockup switching means of the first mode and as the first relay pressure switch means of the second mode. Incidentally, "EX" appearing in FIGS. 3 to 5 designates a drain to the tank.

The aforementioned signal pressure Psl is regulated by the linear solenoid valve 84 shown in FIG. 4. This linear solenoid valve 84 serves as a pressure regulator valve and includes an input port 86 which receives a constant modulator pressure Pm as the initial signal pressure; an output port 88 for outputting the signal pressure Psl; a drain port 90; a feedback oil chamber 92 which receives the signal pressure Psl; and a spring 96 for urging spool valve member 94 toward the solenoid SL. When the energizing current, fed to the solenoid SL for urging the spool valve member 94 toward the spring 96, is subjected to duty control by the aforementioned control unit 52, so that the spool valve member 94 is moved to connect the output port 88 to the input port 86 or the drain port 90, the linear solenoid valve 84 outputs the signal pressure Psl which continuously changes according to the duty ratio SLU of the energizing current. In short, the linear solenoid valve 84 regulates the signal pressure Psl in accordance with the energizing current so that a balance may be established among the oil pressures exerted upon the spool valve member 94, the spring force and the urging force of the solenoid SL. In this embodiment, the signal pressure Psl rises to the higher level for the larger duty ratio SLU of the energizing current.

Between the aforementioned linear solenoid valve 84 and lockup control valve 66, there is arranged a signal pressure relay valve 100. This signal pressure relay valve 100 has a first input port 102 which receives the aforementioned signal pressure Psl; a second input port 104 which receives the modulator pressure Pm, that is the initial signal pressure Psl, as a pressure substituting for the signal pressure Psl, for output to the lockup control valve 66 to apply the lockup clutch 32; a first output port 106 connected to the signal pressure chamber 74 of the lockup control valve 66; a second output port 110 connected to the accumulator control valve 130 of FIG. 5; and a drain port 112. A spool valve member 114 is slidable between a first position, in which it provides communication between the first input port 102 and the second output port 110 and communication between the second input port 104 and the first output port 106, as shown at the right-hand half, and a second position, in which it provides the communication between the first input port 102 and the first output port 106 and communication between the second output port 110 and the drain port 112, as shown at the left-hand half. A spring 116 acts as a bias means for urging the spool valve member 114 to the aforementioned first position. A first relay oil chamber 118 serves to move the spool valve member 114 to the second position against the urging force of the spring 116 when fed with the aforementioned first relay pressure PR1. A second relay oil chamber 120 serves to move the spool valve member 114 to the first position independently of the first relay pressure PR1 when fed with the second relay pressure PR2 from a sequence/reverse control valve 150. The aforementioned second relay pressure PR2 and the first relay pressure PR1 are the same as primary pressure PL1, and the spool valve member 114 has the same pressure receiving area in the first relay oil chamber 118 and in the second relay oil chamber 120. When the relay pressures PR1 and PR2 are respectively fed to the two oil chambers 118 and 120, the spool valve member 114 is held in the first position by the urging force of the spring 116. As a result, the spool valve member 114 is held in the second position only when the first relay pressure PR1 is ON and the second relay pressure PR2 is OFF. In this state, the signal pressure Psl is fed to the lockup control valve 66 so that the lockup clutch 32 can be fully engaged or engaged with slippage in accordance with the signal pressure Psl. When the first relay pressure PR1 is OFF or when the second relay pressure PR2 is ON, even if the first relay pressure PR1 is ON, the spool valve member 114 is held in the first position. As a result, the signal pressure Psl is fed to the accumulator control valve 130, and the modulator pressure Pm is fed to the lockup control valve 66 and the lockup clutch 32 is fully engaged if the first relay pressure PR1 is ON and if the lockup relay valve 54 is ON. The aforementioned solenoid valve 55 for turning ON and OFF the first relay pressure PR1 constitutes the signal pressure switching means of the first mode of the present invention together with the sequence/reverse control valve 150 for turning ON and OFF the second relay pressure PR2. The solenoid valve 55 acts not only as the signal pressure switching means but also as the lockup switching means in the "first mode" of the present invention.

Figure 6:
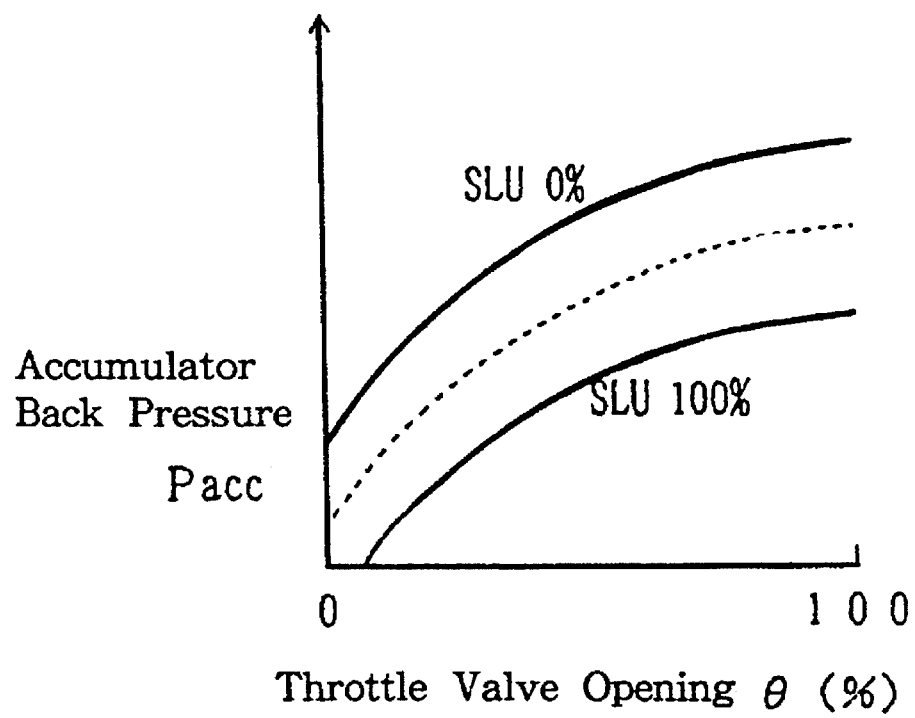
FIG. 6 is a graph of the accumulator back pressure as controlled by the accumulator control valve of FIG. 5.

The accumulator control valve 130 of FIG. 5 regulates the back pressure Pacc of the accumulators (not-shown), which are individually arranged for the hydraulic actuators of the aforementioned clutches $C_1$ and $C_2$ and brakes $B_0$ and $B_2$, according to the signal pressure Psl adjusted by the aforementioned linear solenoid valve 84. These accumulators adjust the transient oil pressures for applying or releasing the aforementioned clutch C and brake B at the time of shifting or at the time of shift lever operation, in accordance with the spring force and the aforementioned back pressure Pacc to thereby damp the shifting shock. The accumulator control valve 130 for regulating the back pressure Pacc serves as the transient pressure control valve. The accumulator control valve 130 has an input port 132 which receives the primary pressure PL1 as the initial back pressure Pacc; an output port 134 for outputting the accumulator back pressure Pacc; a drain port 136; and a spool valve member 138 for switching communication between the output port 134, the input port 132 and the drain port 136. A first oil chamber 140 receives a throttle pressure Pth, which is regulated according to the opening θ of a throttle valve for adjusting the flow rate of intake air of the engine 10, to urge the spool valve member 138 downward in the drawing, i.e., in the direction to increase the communication between the output port 134 and the input port 132. A feedback oil chamber 142 receives the accumulator Pacc to urge the spool valve member 138 upward in the drawing. A signal oil chamber 144 is connected to the second output port 110 of the aforementioned signal pressure relay valve 100 and is fed with the signal pressure Psl to urge the spool valve member 138 upward. Spring 146 urges the spool valve member 138 downward in the drawing. The spool valve member 138 is moved to balance the oil pressures and spring forces so that the accumulator back pressure Pacc is regulated according to the signal pressure Psl and the throttle pressure Pth. FIG. 6 presents one example of the oil pressure control range of the accumulator back pressure Pacc regulated by the accumulator control valve 130. The accumulator back pressure Pacc drops to the lower level, as the duty ratio SLU of the energizing current to the aforementioned linear solenoid valve 84, i.e., the signal pressure Psl, rises to the higher level, and rises to the higher level for a higher throttle pressure Pth.

Returning to FIG. 4, the aforementioned sequence/reverse control valve 150 includes a first input port 152 fed with an O/D stage pressure $P_{O/D}$ as a higher-stage pressure output to the hydraulic actuator of the brake $B_O$ when the higher O/D gear stage of the 3rd and O/D gear stages for applying the lockup clutch 32 is to be established; a second input port 154 which receives an R-range pressure $P_R$ as the reverse stage pressure output from the manual shift valve when the reverse gear stage is to be established; a first output port 156 connected to the second relay oil pressure 120 of the aforementioned signal pressure relay valve 100; a second output port 158 connected to the hydraulic actuators of the clutch $C_2$ and the brake $B_3$ for establishing the reverse gear stage; and a drain port 160. A spool valve member 162 is slidable between a first position, in which it provides communication between the first input port 152 and the first output port 156 but blocks the communication between the second input port 154 and the second output port 158 to thereby cause the second output port 158 to communicate with the drain port 160, as shown at the left-hand half, and a second position, in which it provides communication between the second input port 154 and the second output port 158 but blocks communication between the first input port 152 and the first output port 156 to thereby cause the first output port 156 to communicate with the drain port 160, as shown at the right-hand half. A spring 164 acts as biasing means for urging the spool valve member 162 to the aforementioned first position and a first relay oil chamber 166 receives the first relay pressure PR1 to also urge the spool valve member 162 to the first position. A second relay oil chamber 168 receives a third relay pressure PR3 output by deenergizing the aforementioned solenoid S2 at the time of shifting from the 3rd stage to the O/D stage, to urge the spool valve member 162 to the aforementioned second position. A third relay oil chamber 170 receives the third relay pressure PR3 when the spool valve member 162 is held in the aforementioned first position, to urge the spool valve member 162 to the first position. When the spool valve member 162 is held in the first position by feeding the first relay pressure PR1 to the first relay oil chamber 166, the spool valve member 162 is held there even if the third relay pressure PR3 is fed to the second relay oil chamber 168 and the third relay oil chamber 170 in accordance with an upshift from the 3rd to O/D gear stages, so that the sequence/reverse control valve 150 outputs the aforementioned O/D stage pressure $P_{O/D}$ as the aforementioned second relay pressure PR2 to the second relay oil chamber 120 of the signal pressure relay valve 100. However, when the feed of the first relay pressure PR1 is interrupted at the O/D gear stage, the spool valve member 162 is moved to the second position against the biasing force of the spring 164 by the difference between the pressure receiving areas of the spool valve member 162 in the second relay oil pressure chamber 168 and the third relay oil pressure chamber 170. When the spool valve member 162 takes the second position at the O/D gear stage, it is held in the second position by the third relay pressure PR3 fed to the second relay oil chamber 168, even if the first relay pressure PR1 is fed to the first relay oil chamber 166. The third relay pressure PR3 is at the same level as the primary pressure PL1, like the first relay pressure PR1, and the pressure receiving area of the spool valve member 162 in the second relay oil chamber 168 is larger than that of the spool valve member 162 in the first relay oil chamber 166. On the other hand, the aforementioned third relay pressure PR3 is also fed at the reverse gear stage, by deenergizing the solenoid S2, to hold the spool valve member 162 in the second position so that the R-range pressure $P_R$ is output to the hydraulic actuators of the clutch $C_2$ and the brake $B_3$ to establish the reverse gear stage. However, if the vehicle speed V exceeds the constant value $\alpha$ so that the solenoid S2 is energized to turn OFF the third relay pressure PR3, the spool valve member 162 is moved to the first position by the biasing force of the spring 164 to thereby block the output of the R-range pressure $P_R$ and, accordingly, prevent the establishment of the reverse gear stage.

The aforementioned O/D stage pressure $P_{O/D}$ is output from a 3–4 shift valve 180. This 3–4 shift valve 180 has an input port 182 which receives the primary pressure PL1; a first output port 184 connected to the hydraulic actuator of the aforementioned clutch $C_0$; and a second output port 186 connected to the hydraulic actuator of the aforementioned brake $B_0$ and the first input port 152 of the sequence/reverse control valve 150. A spool valve member 188, in a first position, provides communication between the input port 182 and the first output port 184 and blocks the communication between the input port 182 and the second output port 186, as shown at the right-hand half, and, in a second position, provides communication between the input port 182 and the second output port 186 and blocks communication between the input port 182 and the first output port 184, as shown at the left-hand half. A spring 190 biases the spool valve member 188 to the aforementioned first position. A first relay oil chamber 192 receives the individual range pressures, other than the "D" range, output from the manual shift valve and in the "D" range receives the 1st stage pressure for urging the spool valve member 188 to the first position. The oil pressure level (individual pressures) fed to the oil chamber 182 is the same as the primary pressure PL1. A second relay oil chamber 194 receives the aforementioned third relay pressure PR3 to urge the spool valve member 188 to the second position. The pressure receiving areas of the spool valve member 188 in the first relay oil chamber 192 and the second relay oil chamber 194 are equal. In the individual ranges other than the "D" range, in which the first relay oil chamber 192 is fed with the oil pressure, and at the 1st gear stage in the "D" range, the spool valve member 188 is held in the first position by the biasing force of the spring 190 no matter whether the third relay pressure PR3, i.e., the solenoid S2, might be ON or OFF, so that the primary pressure PL1 is output to the hydraulic actuator of the clutch $C_0$ to apply the clutch $C_0$. In the 2nd and 3rd gear stages of the "D" range, in which the solenoid S2 is ON whereas the third relay pressure PR3 is OFF, the spool valve member 188 is also held in the first position to apply the clutch $C_0$. In the O/D gear stage of "D" range, in which the solenoid S2 is OFF whereas the third relay pressure PR3 is ON, the spool valve member 188 is moved to the second position against the biasing force of the spring 190 so that the primary pressure PL1 is output as the O/D stage pressure $P_{O/D}$ to the hydraulic actuator of the brake $B_0$ and to the sequence/reverse control valve 150 to apply the brake $B_0$. The oil passage to the brake $B_0$ has an orifice 196, which allows for a gradual rise of application pressure $P_{BO}$ of the brake $B_0$ in cooperation with the accumulator.

Returning to FIG. 1, the aforementioned control unit 52 includes a CPU, a RAM, a ROM, an input/output interface and a clock signal source, such as a quartz oscillator. By using the temporary storing function of the RAM, and in accordance with the program stored in advance in the ROM, the control unit 52 processes the signals to switch the energization and deenergization of the aforementioned solenoids S1 and S2 to thereby change the gear stage of the automatic transmission 14, to energize the solenoid S3 and to duty-control the energizing signal to the solenoid SL to thereby apply the lockup clutch 32 fully or with slip, or to duty-control the energizing current to the solenoid SL to thereby regulate the accumulator back pressure Pacc, i.e, the transient pressure for applying or releasing the clutch C and the brake B. The control unit 52 receives from R.P.M. sensors 200, 202 and 204 R.P.M. signals SNt, SNo and SNco indicating the R.P.M. Nt of the input shaft 20, i.e., the turbine blade 22, the R.P.M. No of the output shaft 46, and the R.P.M. Nco of the housing of the clutch Co, i.e., the sun gear of the planetary gear mechanism 40, respectively. A neutral start switch 206 arranged in the manual shift valve sends a shift range signal SR, indicating the aforementioned shift range "P", "R", "N" or "D", as another input to the control unit 52. The control unit 52 also receives an R.P.M. signal SNE indicating engine R.P.M. Ne from an R.P.M. sensor 208 disposed in the engine 10 and a throttle valve opening signal S$\theta$ indicating the throttle valve opening $\theta$ from a throttle sensor 210 disposed in the throttle valve which adjusts the intake air flow to the engine 10.

shift control by the control unit 52 is carried out according to a shift map, which is stored in advance in the RAM or the like, using the detected throttle valve opening $\theta$ and the detected vehicle speed V (corresponding to the output shaft R.P.M. No), as exemplified in FIG. 7, when the shift lever is positioned in a forward range "D", "2" or "L". The reverse gear stage is effected by moving the shift lever to the "R" range whereby the R-range pressure $P_R$ is output from the manual shift valve to the hydraulic actuators of the clutch $C_2$ and the brake $B_3$ through the aforementioned sequence/reverse control valve 150, so that clutch $C_2$ and brake $B_3$ are applied together with the clutch $C_0$, thus establishing the reverse gear stage. Since, in the "R" range, the solenoid S3 for controlling the application of the lockup clutch 32, i.e., the first relay pressure PR1, is not ON, the sequence/reverse control valve 150 is controlled exclusively according to the third relay pressure PR3, so that the spool valve member 162 is held in the second position to establish the reverse gear stage because the solenoid S2 is ordinarily OFF whereas the third relay pressure PR3 is ordinarily ON. However, if the shift range "R" is selected while the forward vehicle speed V exceeds the predetermined constant value $\alpha$, the control unit 52 turns ON (or energizes) the solenoid S2 to interrupt the output of the third relay pressure PR3 so that the spool valve member 162 is moved to the first position by the biasing force of the spring 164 to thereby block establishment of the reverse gear stage. As a result, it is possible to prevent a shift into the reverse gear by erroneous operation of the shift lever.

The back pressure control of the accumulator by the control unit 52 is effected at the time of operation of the shift lever and at the time of a shift. For example, the clutch $C_2$ is applied when the shift lever is moved from the "P" to the "R" range; the clutch $C_2$ is released when the shift lever is moved from the "R" to the "N" range; and the clutch $C_1$ is applied when the shift lever is moved from the "N" to the "D" range. By duty-controlling the energizing current of the linear solenoid valve 84 to regulate the signal pressure Psl, the accumulator back pressure Pacc output from the accumulator control valve 130 is regulated to control the transient oil pressures at the time of applying and releasing the aforementioned clutches $C_1$ and $C_2$ to thereby reduce the shifting shock accompanying the application and the release. Moreover, the brake $B_2$ is applied at the time of shifting from the 1st to 2nd gear stages, and the clutch $C_2$ is applied at the time of shifting from the 2nd to 3rd gear stages. In this case, also, the energizing current of the linear solenoid valve 84 is duty-controlled to regulate the accumulator back pressure Pacc so that the transient oil pressures for applying the brake $B_2$ and the clutch $C_2$ are controlled to reduce the shifting shock. During this shift lever operation time and in the 1st and 2nd gear stages, the solenoid S3 for controlling the application of the lockup clutch 32, i.e., the first relay pressure PR1, is not turned ON. As a result, the spool valve member 114 of the signal pressure relay valve 100 is held in the first position by the biasing force of the spring 116 so that the signal pressure Psl output from the linear solenoid valve 84 is fed through the signal pressure relay valve 100 to the accumulator control valve 130.

Figure 8:
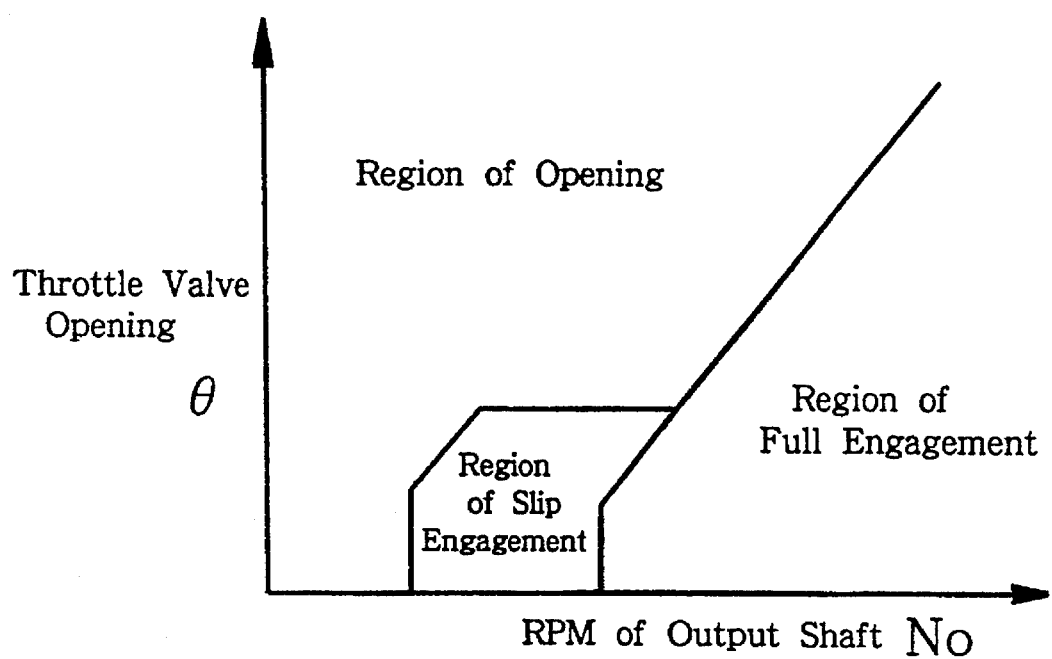
FIG. 8 is a diagram showing the regions of engagement of a lockup clutch in the embodiment of FIG. 1.

At the 3rd and O/D gear stages, on the other hand, the lockup clutch 32 is fully applied or applied with slip according to the data map which is stored in advance in the RAM or the like by using the throttle valve opening θ and the output shaft R.P.M. No, as exemplified in FIG. 8. Specifically, it is decided whether the running state of the vehicle dictated by the throttle valve opening θ and the output R.P.M. No is in the region of full engagement or slip engagement. If this answer is YES, the solenoid S3 is turned ON (or energized) to output the first relay pressure PR1. As a result, the lockup relay valve 54 is turned ON, and the spool valve member 114 of the signal pressure relay valve 100 is moved to the second position, so that the signal pressure Psl is fed to the lockup control valve 66. As a result, if the energizing current of the solenoid SL of the linear solenoid valve 84 is duty-controlled in that state to regulate the signal pressure Psl, the pressure difference ΔP between the application pressure Pon and the release pressure Poff, i.e., the force applied to the lockup clutch 32, is adjusted according to the regulated signal pressure Psl by the lockup control valve 66 to establish the predetermined slipping state or fully applied state. Slippage of lockup clutch 32 is controlled by subjecting the duty ratio SLU of the energizing current of the solenoid SL to the feedback control so that the R.P.M. difference ΔN between the engine R.P.M. NE and the turbine R.P.M. Nt is adjusted to a predetermined value.

Figure 7:
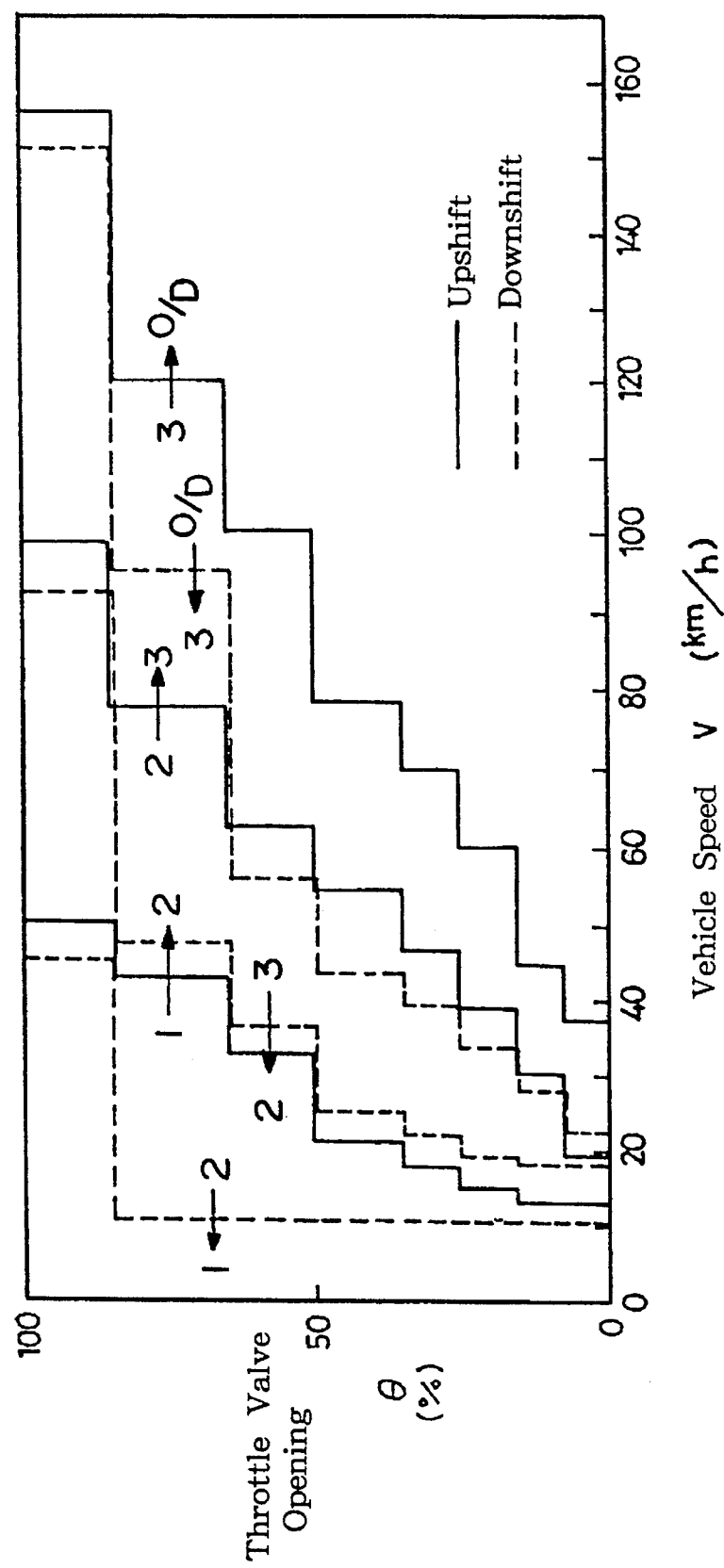
FIG. 7 is a graph or "shift map" illustrating the shifting of the gear stages of the automatic transmission in the embodiment of FIG. 1.
Figure 9:
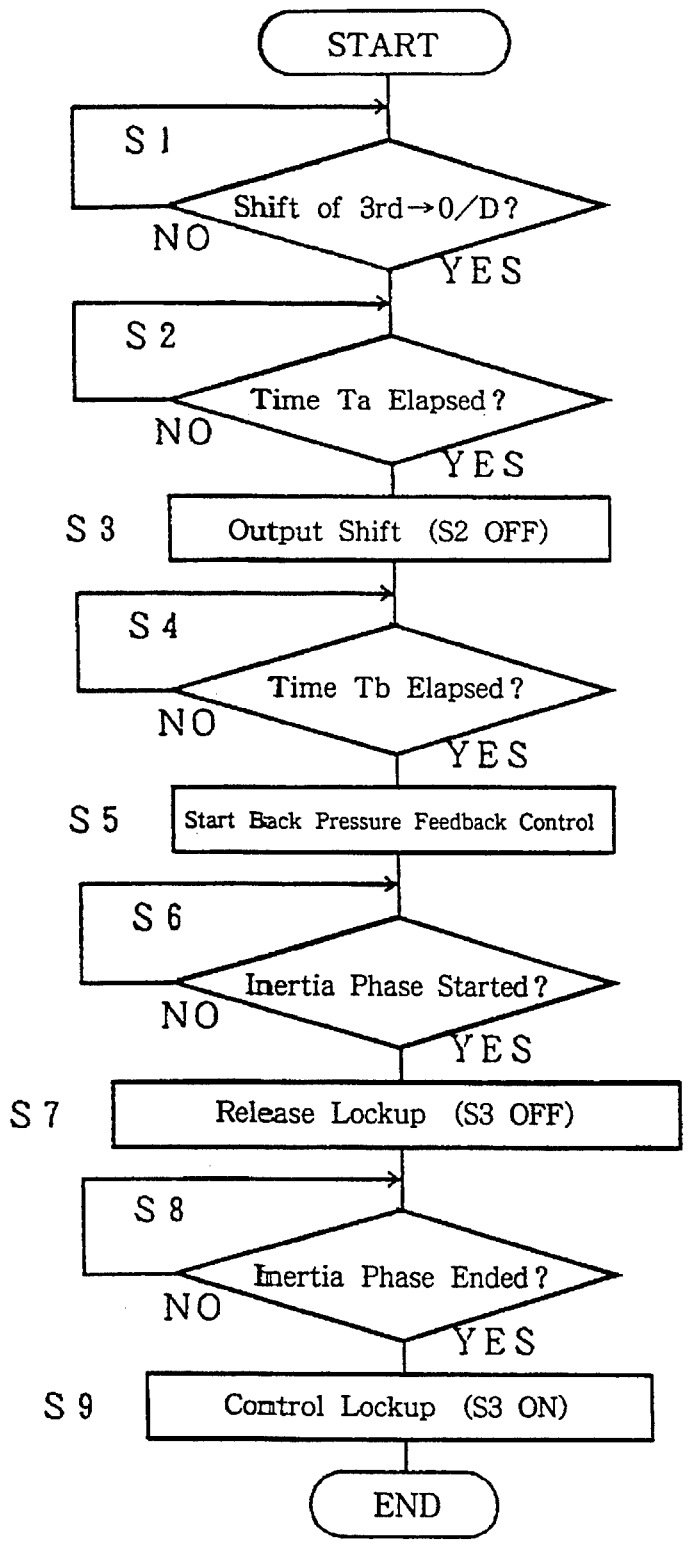
FIG. 9 is a flow chart explaining the procedure which is executed for a shift from 3rd to O/D, with the lockup clutch applied, in the embodiment of FIG. 1.
Figure 10:
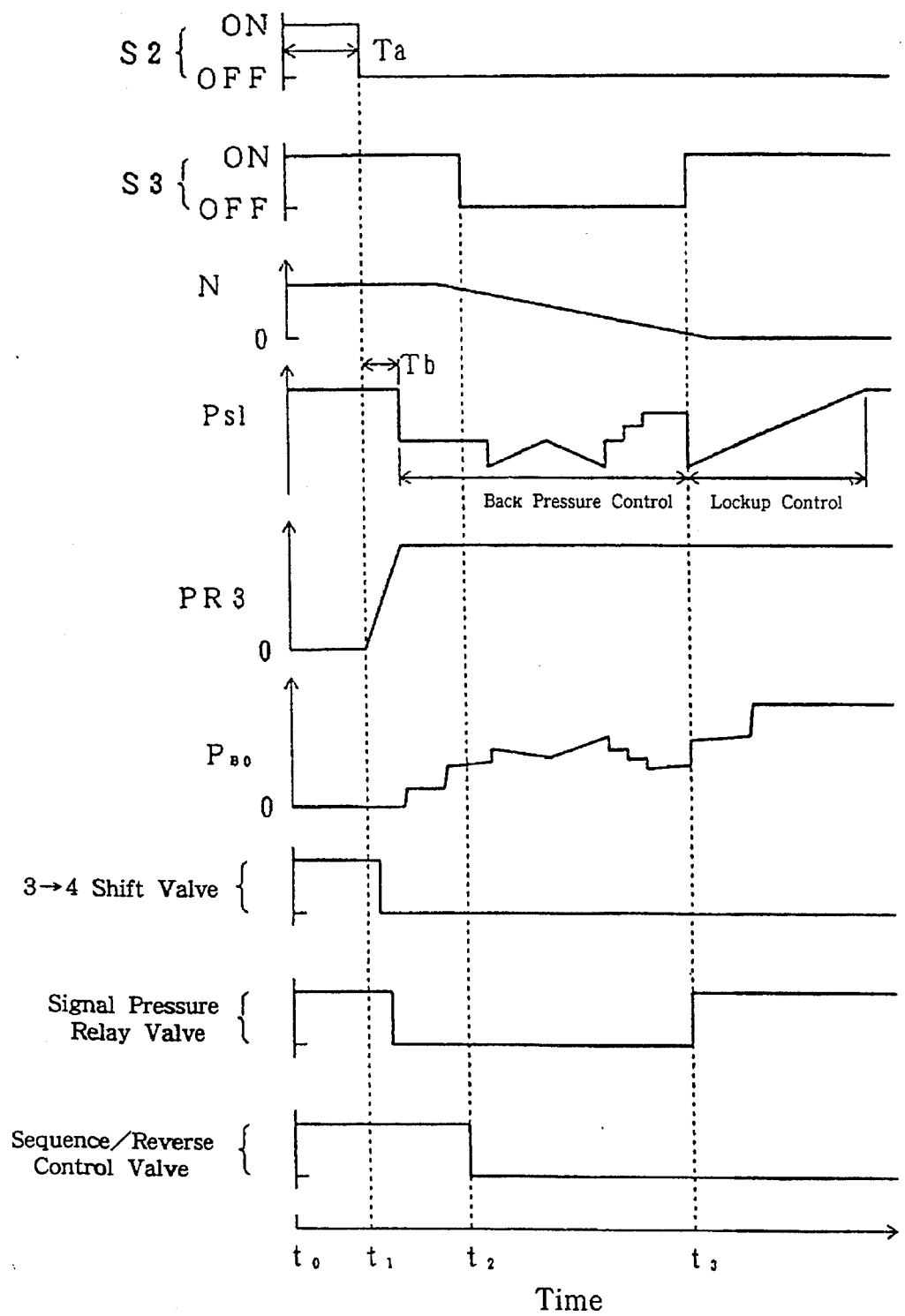
FIG. 10 is a time chart explaining the operating states of the individual control system components when lockup control and the back pressure control are carried out according to the flow chart of FIG. 9.

At the time of an upshift to the O/D gear stage, on the other hand, when the lockup clutch 32 is fully applied or applied with slip at the 3rd gear stage, the shift control, the lockup control and the back pressure control of the accumulator are carried out, as exemplified in FIGS. 9 and 10. At Step S1 of FIG. 9, it is decided whether or not the shift from the 3rd to O/D gear stages has been decided according to the shift map, as shown in FIG. 7. If this answer is YES, it is decided at Step S2 whether or not a predetermined time period Ta has elapsed after the aforementioned shift decision. At time $t_0$ of FIG. 10, the shift of 3rd to O/D stages is decided. At the time $t_1$, a predetermined time period Ta has elapsed subsequent to time $t_0$. The time period Ta is determined with a view to preventing a multiplex shift, in which the shifting action is repeated for a short time period.

After the time period Ta has elapsed, Step S3 is executed to release the energization of the solenoid S2 so as to switch the gear stages from the 3rd to the O/D stage. When the solenoid S2 is deenergized, the third relay pressure PR is turned ON and allowed to rise. According to this rise of the third relay pressure PR3, the spool valve member 188 of the 3–4 shift valve 180 is moved from the first position to the second position against the biasing force of the spring 190 so that the feed of the primary pressure PL1 to the clutch $C_0$ is interrupted to release the clutch $C_0$ and to output the O/D stage pressure $P_{O/D}$ to the hydraulic actuator of the brake Bo and the sequence/reverse control valve 150. Since, at this time, the spool valve member 162 of the sequence/reverse control valve 150 is positioned in the first position by the first relay pressure PL1 and the biasing force of the spring 164 and held in the first position irrespective of the feed of the third relay pressure PR3 accompanying the shifting output to the O/D gear stage, so that the O/D stage pressure $P_{O/D}$ is introduced as the second relay pressure PR2 to the second relay oil chamber 120 of the signal pressure relay valve 100 through the sequence/reverse control valve 150. As a result, the spool valve member 114 of the signal pressure relay valve 100 is moved to the first position, so that the signal pressure Psl to be adjusted by the linear solenoid valve 84 is fed to the accumulator control valve 130 whereas the modulator pressure Pm is fed to the lockup control valve 66. As a result, the lockup clutch 32 is fully applied. The terms "upper" and "lower" positions used with respect to the 3–4 shift valve, the signal pressure relay valve and the sequence/reverse control valve of FIG. 10 refer to the upper and lower positions of the individual spool valve members of FIG. 4. The "upper" and "lower" positions of the 3–4 shift valve correspond to the first position and the second position. The "upper" and "lower" positions of the signal pressure relay valve correspond to the first position and the second position. The "upper" and "lower" positions of the sequence/reverse control valve correspond to the first position and the second position.

At Step S4, it is decided whether or not a predetermined time period Tb has elapsed after the solenoid S2 was turned OFF. If the answer is YES, the feedback control of the accumulator back pressure Pacc is started at Step S5 by duty-controlling the energizing current of the linear solenoid valve 84. The aforementioned time period Tb is longer than the delay from the time when the signal pressure relay valve 100 was switched in response to turning the solenoid S2 OFF until the time when the signal pressure Psl is fed to the accumulator control valve 130, and occurs before the start of the inertia phase accompanying the application of the brake $B_0$. However, the back pressure of Step S5 may be started by detecting the movement of the spool valve member 114 of the signal pressure relay valve 100 or the oil pressure in the signal oil chamber 144 of the accumulator control valve 130. Moreover, the back pressure feedback control of Step S5 is effected by feedback-controlling the duty ratio SLU of the energizing current of the solenoid SL so that the R.P.M. Nco of the housing of the clutch $C_0$ may drop at a predetermined rate, and the application pressure $P_{BO}$ of the brake $B_0$ is changed with the characteristics reversed from those of the accumulator back pressure Pacc.

At Step S6, whether or not the inertia phase accompanying the shift has started is decided in terms of change in the R.P.M. Nco to be interrupted as the brake $B_0$ is applied and in dependence upon whether or not the ratio Nt/No of the R.P.M. Nt to the R.P.M. No is smaller than 1. If it is decided that the inertia phase has been started, the energization of the solenoid S3 is released at Step S7 to interrupt the output of the first relay pressure PR1 to thereby turn OFF the lockup relay valve 54 so that the lockup clutch 32 is released. At the time $t_2$ in FIG. 10, the energization of the solenoid valve S3 is released. Thus, the lockup clutch 32 is released after the inertia phase has been started, so that an abrupt change in the engine R.P.M. NE accompanying the shift is absorbed by the torque converter 12 while avoiding the unnecessary racing of the engine 10. When the first relay pressure PR1 is turned OFF, the spool valve member 162 of the sequence/reverse control valve 150 is moved to the second position by the third relay pressure PR3. From now on, the spool valve member 162 is held in the second position no matter whether the first relay pressure PR1 might be ON or OFF, so that the output of the second relay pressure PR2 to the signal pressure relay valve 100 is blocked. In short, the spool valve member 114 of the signal pressure relay valve 100 is moved to the second position or the first position exclusively in response to the ON or OFF of the first relay pressure PR1. As a result, the lockup clutch 32 can be applied or released in response to the ON or OFF of the first relay pressure PR1. If applied, the lockup clutch 32 can be allowed to slip under control by the linear solenoid valve 84.

At Step S8, whether or not the inertia phase has substantially ended is decided depending upon whether or not the R.P.M. Nco is substantially reduced to zero or whether or not the ratio Nt/No of the R.P.M. Nt to the R.P.M. No is substantially equal to the gear ratio of the O/D gear stage. If the inertia phase has substantially ended, the solenoid S3 is turned ON (or energized) at Step S9 to output the first relay pressure PR1. At the time $t_3$ in FIG. 10, the solenoid S3 is turned ON to turn 0N the lockup relay valve 54 again and to move the spool valve member 114 of the signal pressure relay valve 100 to the second position so that the signal pressure Psl, adjusted by the linear solenoid valve 84, is fed to the lockup control valve 66. Then, the duty ratio SLU of the energizing current of the linear solenoid valve 84, i.e., the signal pressure Psl is gradually raised to bring the lockup clutch 32 into a fully released state or a predetermined slip state. After this, ordinary lockup control may be carried out on the basis of the data map of FIG. 8. The feedback control of the accumulator back pressure Pacc started at the foregoing Step S5 is ended at the instant when the solenoid S3 is turned ON at Step S9.

Thus, the hydraulic control by circuit 50 of the present embodiment is achieved with a single linear solenoid valve 84, i.e. the single linear solenoid valve 84 controls slipping of the lockup clutch 32 at the 3rd gear stage and at the O/D gear stage and controls the accumulator back pressure Pacc at the time of shifting and at the time of shift lever operation. At the time of an upshift from the 3rd to O/D gear stage when the lockup clutch 32 is fully engaged or applied with slip, the back pressure control of the accumulator can be started while leaving he lockup clutch 32 applied.

At an upshift from the 3rd to O/D gear stage when the lockup clutch 32 is applied, on the other hand, the O/D stage pressure $P_{O/D}$ is fed as the second relay pressure PR2 to the signal pressure relay valve 100 so that the spool valve member 114 of the signal pressure relay valve 100 is forcibly moved to the first position, independently of the existence of the first relay pressure PR1, so that no special control is required for switching the signal pressure relay valve 100. At the same time, the sequence/reverse control valve 150 for outputting the second relay pressure PR2 also functions to block the establishment of the reverse gear stage under a predetermined condition. As a result, there is achieved the advantage that the number of valves can be reduced to make the hydraulic control circuit 50 more compact.

Moreover, the lockup clutch 32 can be released independently of the signal pressure Psl by deenergizing the solenoid valve 55 to interrupt the output of the first relay pressure PR1 and by turning OFF the lockup relay valve 54. Therefore, at the time of a malfunction such as improper regulation of or feed interruption of the signal pressure Psl, due to sticking of the linear solenoid valve 84, sticking of the lockup control valve 66 or the modulator valve for outputting the modulator pressure Pm, or due to the breaking or short-circuiting of the solenoid SL, the lockup clutch 32 may be released by deenergizing the solenoid valve 55. The malfunction can be decided, for example, by detecting the breaking or short-circuit of the solenoid SL electrically or by monitoring whether or not the R.P.M. difference between the engine R.P.M. NE and the turbine R.P.M. Nt during lockup control is within a predetermined allowable range.

Figure 11:
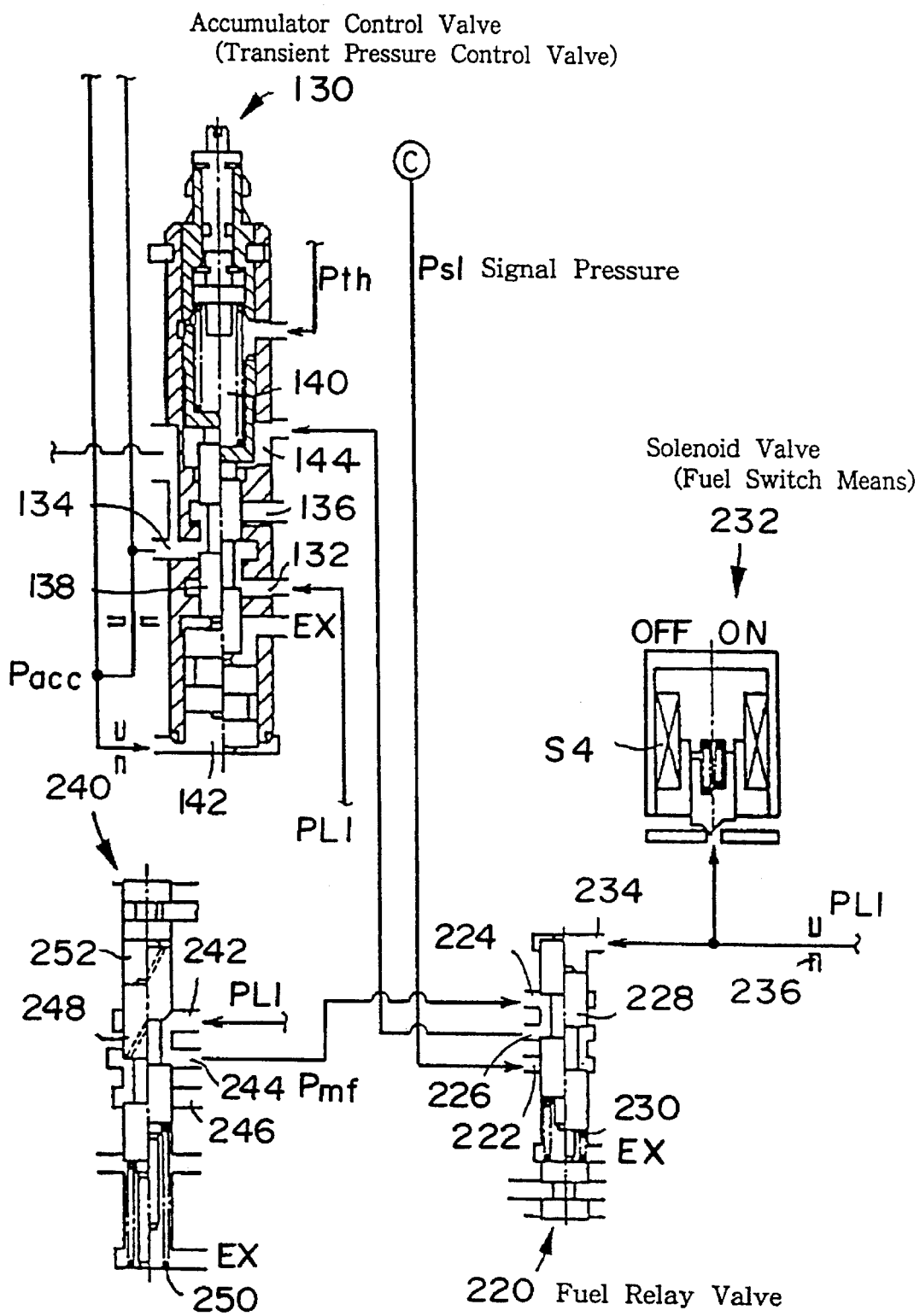
FIG. 11 is a hydraulic circuit diagram explaining another embodiment (third mode) of the present invention.

The embodiment thus far described is one embodiment providing first and second modes of the present invention. A third mode will now be described in the following. In the embodiment of FIG. 11, a fuel relay valve 220 is arranged between the signal pressure relay valve 100 and the accumulator control valve 130 of the foregoing embodiment. The fuel relay valve 220 has a first input port 222 connected to the second output port 110 of the signal pressure relay valve 100 so that it is fed with the aforementioned signal pressure Psl; a second input port 224 to be fed with a constant modulator pressure Pmf as a fuel substitution pressure from a modulator valve 240; an output port 226 connected to the signal oil chamber 144 of the accumulator control valve 130; a spool valve member 228 which slides between a first position, in which it provides communication between the first input port 222 and the output port 226, as shown at the right-hand half, and a second position in which it provides communication between the second input port 224 and the output port 226, as shown at the left-hand half. A spring 230 urges the spool valve member 228 to the second position; and a relay oil chamber 234, fed with the primary pressure PL1 through an orifice 236 when a solenoid valve Sr of a solenoid valve 232 is OFF (or deenergized), moves the spool valve member 228 to the first position against the biasing force of the spring 230. The aforementioned solenoid S4 is turned ON and OFF by the aforementioned control unit 52. When the solenoid S4 is OFF, the spool valve member 228 is held in the first position against the biasing force of the spring 230, and the signal pressure Psl is output from the signal pressure relay valve 100 to the accumulator control valve 130 so that the accumulator back pressure Pacc is regulated on the basis of the signal pressure Psl as in the foregoing embodiment. When, on the other hand, the solenoid S4 is turned ON to interrupt the feed of the primary pressure PL1 to the relay oil chamber 234, the spool valve member 228 is moved to the second position by the biasing force of the spring 230, and the modulator pressure Pmf is output to the accumulator control valve 130 to regulate the accumulator back pressure Pacc on the basis of the modulator pressure Pmf. The aforementioned solenoid valve 232 serves as the fuel switch means.

The aforementioned modulator valve 240 has an input port 242 which receives the primary pressure PL1; an output port 244 for outputting the modulator pressure Pmf; a drain port 246; a spool valve member 248 for changing the state of communication between the output port 244, the input port 242 and the drain port 246; a spring 250 for urging the spool valve member 248 in the direction increasing communication between the input port 242 and the output port 244; and a feedback oil chamber 252 fed with the modulator pressure Pmf for urging the spool valve member 248 toward the spring 250. The spool valve member 248 is moved to balance the spring force of the spring 250 and the modulator pressure Pmf so that the constant modulator pressure Pmf corresponding to the spring force is output. This modulator pressure Pmf is set to an intermediate level in the regulated range of the signal pressure Psl so that, when it is substituted for the signal pressure Psl as a feed to the accumulator control valve 130, the duty ratio SLU of the energizing current for energizing the solenoid SL of the aforementioned linear solenoid valve 84 will have hydraulic characteristics intermediate the values for the SLU of 0% and 100%, as illustrated by a broken curve in FIG. 6.

In this hydraulic control circuit, the solenoid S4 of the solenoid valve 232 is ordinarily OFF, and the signal pressure Psl fed from the signal pressure relay valve 100 is output to the accumulator control valve 130 so that the accumulator back pressure Pacc is regulated on the basis of the signal pressure Psl. On the other hand, at the time of a malfunction such as improper regulation or feed interruption of the signal pressure Psl, due to the valve sticking of the linear solenoid valve 84 or of the modulator valve for outputting the modulator pressure Pm, or the breaking or short-circuiting of the solenoid SL, the solenoid S4 of the solenoid valve 232 is turned ON (or energized) to feed the modulator pressure Pmf, in place of the signal pressure Psl, to the accumulator control valve 130, so that the accumulator Pacc is regulated on the basis of the modulator pressure Pmf. When a malfunction occurs, therefore, the accumulator back pressure Pacc is adjusted to a predetermined level corresponding to the modulator pressure Pmf so that the shortening of the lifetime of the frictional elements due to the shock or the delay of application caused by an abrupt application of the clutch C and the brake B can be avoided as much as possible. Whether or not a malfunction has occurred can be decided, for example, by detecting the breaking or short-circuiting of the solenoid SL or by monitoring a change in the R.P.M. such as the engine R.P.M. Ne or the turbine R.P.M. Nt at the time of a shift.

Figure 12:
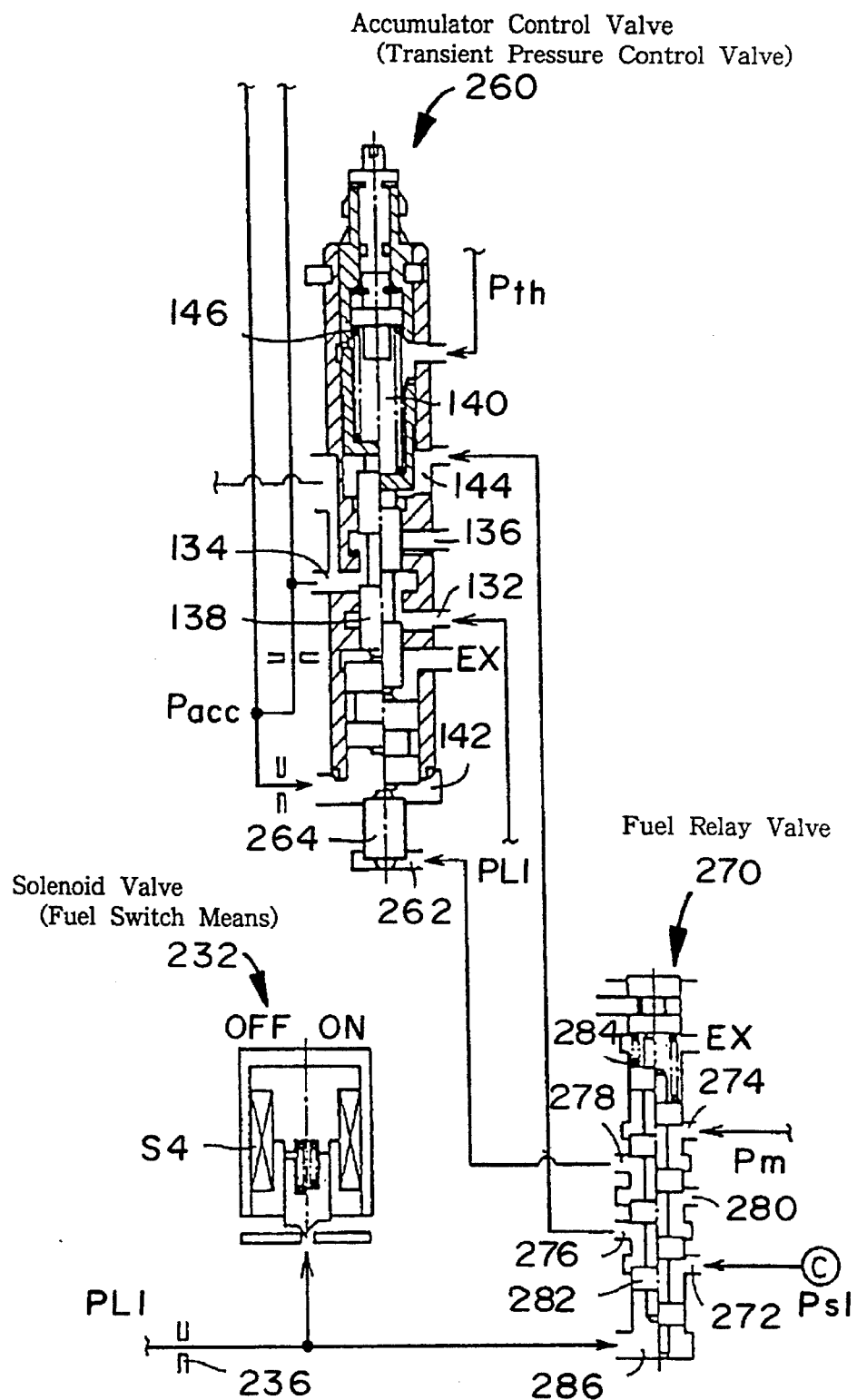
FIG. 12 is a hydraulic circuit diagram explaining yet another embodiment (third mode).

FIG. 12 also shows one embodiment of a third mode of the present invention. An accumulator control valve 260, acting as the transient pressure control valve, has an auxiliary oil chamber 262 and a plunger 264 for transmitting the oil pressure fed to the auxiliary oil chamber 262 to the spool valve member 238. Valve 260 additionally has the aforementioned input port 132, output port 134, drain port 136, spool valve member 138, first oil chamber 140, feedback oil chamber 142, signal oil chamber 144 and spring 146. On the other hand, a fuel relay valve 270 has a first input port 272 connected to the second output port 110 of the signal pressure relay valve 100 and fed with the aforementioned signal pressure Psl; a second input port 274 fed with the aforementioned modulator pressure Pm or the initial pressure of the signal pressure Psl, in place of the fuel substitution pressure; a first output port 276 connected to the signal oil chamber 144 of the accumulator control valve 260; a second output port 278 connected to the auxiliary oil chamber 262 of the accumulator control valve 260; and a drain port 280. A spool valve member 282 is slidably mounted within valve 270 for movement between a first position, in which it provides communication between the first input port 272 and the first output port 276 and communication between the second output port 278 and the drain port 280, as shown at the left-hand half, and a second position, in which it provides communication between the second input port 274 and the second output port 278 and communication between the first output port 276 and the drain port 280, as shown at the right-hand side. A spring 284 urges the spool valve member 282 toward the second position; and a relay oil chamber 286 fed with the primary pressure PL1, when the solenoid S4 of the aforementioned solenoid valve 232 is OFF (or deenergized), urges the spool valve member 282 toward the first position, against the biasing force of the spring 284.

As a result, when the solenoid S4 is OFF, the spool valve member 282 of the fuel relay valve 270 is held in the first position, and the signal pressure Psi is fed from the signal pressure relay valve 100 to the signal oil chamber 144 of the accumulator control valve 260 so that the accumulator back pressure Pacc is regulated on the basis of the signal pressure Psl. When the solenoid S4 is turned ON in response to a malfunction, on the other hand, the spool valve member 282 of the fuel relay valve 270 is moved to the second position by the biasing force of the spring 284, and the modulator pressure Pm is fed to the auxiliary oil chamber 262 of the accumulator control valve 260 so that the accumulator back pressure Pacc is regulated on the basis of the modulator pressure Pm. The plunger 264 for transmitting the internal pressure of the auxiliary oil chamber 262 has its sectional area predetermined to establish the desired back pressure characteristics. The present embodiment can achieve effects similar to those of the aforementioned embodiment of FIG. 11.

Although the present invention has been described in detail in connection with the foregoing embodiments shown in the drawings, it can be embodied in other forms.

In the foregoing embodiments, for example, the signal pressure switching means for switching the signal pressure relay valve 100 includes the solenoid valve 55 and the sequence/reverse control valve 150. However, the solenoid valve 55 may be dedicated exclusively to switching the lockup relay valve 54, and there can be added a solenoid valve for switching the signal pressure relay valve 100 independently.

In the foregoing embodiments, moreover, the sequence/reverse control valve 150 performs both the sequence control function and the reverse control function. However, it is possible to use a valve which performs only a sequence control function to switch the signal pressure relay valve 100 at the time of shifting.

Further, in the foregoing embodiments, the pressure regulator valve is exemplified by the linear solenoid valve 84. However, another hydraulically controllable valve such as a duty solenoid valve, may be used instead of valve 84.

In the foregoing embodiments, furthermore, the transient oil pressure is controlled by regulating the accumulator back pressure Pacc. However, a control valve may be used for controlling the transient pressure of the frictional engagement means directly.

In the foregoing embodiments, furthermore, the present invention has been described for the case where the lockup control is carried out at the 3rd and O/D gear stages. However, the lockup control can also be carried out at a 3rd or higher gear stage, and the transient pressure control can be started at two or more upshifts while the lockup clutch 32 is applied.

In the foregoing embodiments, furthermore, the lockup clutch is released in the inertia phase. However, the lockup control and the transient pressure control can be suitably modified such that the shift is effected with the lockup clutch 32 being applied, under a predetermined condition in which the throttle valve opening θ and the vehicle speed V have predetermined or lower values. Incidentally, when the sequence/reverse control valve 150 is used, slip control of the lockup clutch 32 cannot be started before the first relay pressure PR1 is once turned OFF to release the lockup clutch 32.

Furthermore, the constructions of the hydraulic circuits and the valves, as shown in FIGS. 3 to 5, FIG. 11 and FIG. 12, are presented merely by way of example and can be suitably modified, if necessary.

In the foregoing embodiments, furthermore, a torque converter 12 is used but can be replaced by another hydraulic power transmission device such as a fluid coupling.

Furthermore, the foregoing embodiments are described in connection with an automatic transmission 14 having forward four gear stages, but this automatic transmission 14 is presented merely by way of example and may have a different number of gear stages and/or different construction.

Although not specifically exemplified, the present invention can be practiced in different modes including various modifications and improvements within the knowledge of those skilled in the art.

What is claimed is:

1. A hydraulic control circuit for an automatic transmission having gearing, a plurality of hydraulic frictional engagement elements for establishing plural gear stages, and a hydraulic power transmission device with a lockup clutch for transmitting power from an engine to the gearing, the lockup clutch having an application side oil chamber and a release side oil chamber, said hydraulic control circuit comprising:

a lockup relay valve for switching an oil pressure between the application side oil chamber and the release side oil chamber of the lockup clutch to apply and release the lockup clutch;

lockup switching means for switching said lockup relay valve;

a lockup control valve for increasing the pressure difference between the pressure in the application side oil chamber and the pressure in the release side oil chamber at the time of application of the lockup clutch, in accordance with rise of a signal pressure;

a transient pressure control valve for controlling transient pressure to the hydraulic frictional engagement elements in accordance with the signal pressure;

a single pressure regulator valve for regulating the signal pressure fed to said lockup control valve and said transient pressure control valve;

a signal pressure relay valve having:
 a first input port for receiving the signal pressure;
 a second input port for receiving a substitution pressure, in place of said signal pressure, for output to said lockup control valve to apply the lockup clutch;
 a first output port connected to said lockup control valve;
 a second output port connected to said transient pressure control valve;
 a valve member movable between a first position, in which it provides communication between said first input port and said second output port and communication between said second input port and said first output port, and a second position in which it provides communication between said first input port and said first output port; and signal pressure switching means for moving the valve member of said signal pressure relay valve selectively to either said first position or said second position.

2. A hydraulic control circuit for an automatic transmission having gearing, a plurality of hydraulic frictional engagement elements for establishing plural gear stages, and a hydraulic power transmission device with a lockup clutch for transmitting an engine power to the gearing, the lockup clutch having an application side oil chamber and a release side oil chamber, said hydraulic control circuit comprising:

a lockup relay valve for switching an oil pressure between the application side oil chamber and the release side oil chamber of the lockup clutch to apply and release the lockup clutch;

first relay pressure changing means for turning ON/OFF a first relay pressure to switch said lockup relay valve;

a lockup control valve for increasing the pressure difference between the pressure in the application side oil chamber and the pressure in the release side oil chamber at the time of application of the lockup clutch, in accordance with rise of a signal pressure;

a transient pressure control valve for controlling transient pressure to the hydraulic frictional engagement elements in accordance with the signal pressure;

a single pressure regulator valve for regulating the signal pressure fed to both said lockup control valve and said transient pressure control valve;

a signal pressure relay valve having:
 a first input port for receiving the signal pressure;
 a second input port for receiving a substitution pressure, in place of said signal pressure, for output to said lockup control valve to apply the lockup clutch;
 a first output port connected to said lockup control valve;
 a second output port connected to said transient pressure control valve;
 a valve member movable between a first position, in which it provides communication between said first input port and said second output port and communication between said second input port and said first output port, and a second position in which it provides communication between said first input port and said first output port;
 bias means for urging said valve member to said first position;
 a first relay oil chamber for moving said valve member to said second position, against the biasing force of said bias means, responsive to receipt of said first relay pressure;
 a second relay oil chamber for moving said valve member to said first position, independently of said first relay pressure, responsive to a second relay pressure; and a sequence/reverse control valve having:
 a first control valve input port for receiving a higher stage pressure output when a higher one of a plurality of consecutive forward gear stages, in which said lockup clutch is applied, is to be established;
 a second control valve input port for receiving a reverse stage pressure output when a reverse gear stage is to be established;

a first control valve output port connected to the second relay oil chamber of said signal pressure relay valve;

a second control valve output port for outputting said reverse stage pressure to engage one of said plurality of hydraulic frictional engagement elements to establish said reverse gear stage;

a second valve member movable between a first position, providing communication between said first control valve input port and said first control valve output port and blocking communication between said second control valve input port and said second control valve output port, and a second position providing communication between said second control valve input port and said second control valve output port and blocking communication between said first control valve input port and said first control output port;

second bias means for urging said second valve member toward said first position;

a first control valve relay oil chamber for receiving said first relay pressure to urge said second valve member toward said first position;

a second control valve relay oil chamber for receiving a third relay pressure, which is output, when said higher gear stage and said reverse gear stage are to be established, but is blocked to prevent establishment of said reverse gear stage responsive to detection of a predetermined condition, to urge said second valve member toward said second position; and a third control valve relay oil chamber for receiving said third relay pressure when said second valve member is held in said first position, to urge valve member to said first position, whereby:

when said first relay pressure is fed to said first control valve relay oil chamber, to hold said second valve member in said first position, said second valve member remains held in said first position even if said third relay pressure is fed to said second control valve relay oil chamber and said third relay oil chamber in accordance with the shift to said higher gear stage, so that said higher stage pressure is output as said second relay pressure to the second relay oil chamber of said signal pressure relay valve;

when the feed of said first relay pressure is interrupted at said higher gear stage, said second valve member is moved to said second position against the biasing force of said second bias means on the basis of the difference between the pressure receiving areas of said second valve member in said second control valve relay oil chamber and said third control valve relay oil chamber;

when said second valve member is held in said second position at said higher gear stage, said second valve member is held in said second position on the basis of said third relay pressure fed to said second control valve relay oil chamber, even if said first relay pressure is fed to said first control valve relay oil chamber; and at the time of shifting to said reverse gear stage, said second valve member is moved by said third relay pressure and the biasing force of said second bias means.

3. A hydraulic control circuit for an automatic transmission according to claim 1, further comprising:

a fuel relay valve arranged between said signal pressure relay valve and said transient pressure control valve and having:

a first fuel relay valve input port connected to the second output port of said signal pressure relay valve;

a second fuel relay valve input port for receiving a predetermined fuel substitution pressure;

a fuel relay valve output port connected to said transient pressure control valve; and a valve member movable between a first position, providing communication between said first fuel relay valve input port and said fuel relay valve output port, and a second position providing communication between said second fuel relay valve input port and said fuel relay valve output port; and fuel switching means for moving the valve member of said fuel relay valve selectively to either said first position or said second position.

4. A hydraulic control circuit for an automatic transmission according to claim 2, further comprising:

a fuel relay valve arranged between said signal pressure relay valve and said transient pressure control valve and having:

a first fuel relay valve input port connected to the second output port of said signal pressure relay valve;

a second fuel relay valve input port for receiving a predetermined fuel substitution pressure;

a fuel relay valve output port connected to said transient pressure control valve; and a valve member movable between a first position, providing communication between said first fuel relay valve input port and said fuel relay valve output port, and a second position providing communication between said second fuel relay valve input port and said fuel relay valve output port; and fuel switching means for moving the valve member of said fuel relay valve selectively to either said first position or said second position.

* * * * *